(12) United States Patent
Takahashi et al.

(10) Patent No.: US 6,516,094 B1
(45) Date of Patent: Feb. 4, 2003

(54) DIGITAL IMAGE CODING METHOD AND DIGITAL IMAGE DECODING METHOD

(75) Inventors: Jun Takahashi, Katanoshi (JP); Choong Seng Boon, Moriguchishi (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/113,140

(22) Filed: Jul. 10, 1998

(30) Foreign Application Priority Data

Jul. 11, 1997 (JP) .............................. 9-187034

(51) Int. Cl.[7] .............................. G06K 9/36; G06K 9/46
(52) U.S. Cl. ..................... 382/243; 382/233; 382/248
(58) Field of Search ............................ 382/232, 233, 382/243, 248, 250; 375/240.08, 240.1, 240.18, 240.2; 348/903.1, 395.1, 397.1

(56) References Cited

U.S. PATENT DOCUMENTS

| 5,107,348 A | | 4/1992 | Citta et al. ................... 358/136 |
| 5,459,513 A | * | 10/1995 | Oddou ................... 375/240.09 |
| 5,654,762 A | | 8/1997 | Slavin et al. ............... 348/420 |
| 5,666,212 A | * | 9/1997 | Gilge ..................... 358/426.12 |
| 5,946,419 A | * | 8/1999 | Chen et al. ................. 382/190 |
| 6,014,173 A | * | 1/2000 | Miyamoto ................... 348/699 |
| 6,031,572 A | * | 2/2000 | Christopoulos .......... 375/240.1 |

FOREIGN PATENT DOCUMENTS

| JP | 2-205173 | 8/1990 | .......... H04N/1/415 |
| JP | 3-129981 | 6/1991 | ............ H04N/7/13 |
| JP | 9-102953 | 4/1997 | ............ H04N/7/30 |

* cited by examiner

*Primary Examiner*—Timothy M. Johnson
(74) *Attorney, Agent, or Firm*—Wenderoth, Lind & Ponack, L.L.P.

(57) ABSTRACT

A digital image coding method comprises the steps of: dividing an image into plural regions each having an arbitrary shape, subjecting an image signal of a required region of the plural regions to transformation so that an arbitrary shape of the required region of a boundary between the required region and a region adjacent thereto is-transformed, and compressively coding the image signal of the required region and compressively coding image signals of regions except the required region with-out subjecting them to transformation; generating identifiers for identifying respective regions; generating list information which describes an identifier of a region adjacent to the required region, which is required for restoring the transformed shape to the shape before transformation; and outputting compressively coded data in which the image signals of respective regions have been compressively coded, the identifiers of respective regions, and the list information an a coded image signal.

35 Claims, 16 Drawing Sheets

DIGITAL IMAGE CODING METHOD AND DIGITAL IMAGE DECODING METHOD

FIELD OF THE INVENTION

The present invention relates to a digital image coding method, a digital image coding apparatus, a digital image decoding method, a digital image decoding apparatus, a data structure for image transmission, and a data recording medium in which a program for implementing these methods or apparatuses in software is stored and, more particularly to a method in which an image is divided into plural regions and coded with improved efficiency.

BACKGROUND OF THE INVENTION

In recent years, we have been in the age of "multimedia" which handles audio, video, and other data integratively. The multimedia is used to transmit information of conventional information media, namely, newspapers, magazines, televisions, radios, telephones, and so forth, to users. In general, in the multimedia, graphics, sound, images, and so forth, as well as characters, are related to each other simultaneously. It is essential that information of the conventional information media be in a digital format so that it is intended for the multimedia.

Information of each information medium is given in terms of amount of digital information. For example, characters require information of 1 to 2 bytes per character, while sounds require information of 64 kbits (telephone quality) per second, and further, moving pictures require information of 100 Mbits or more (current television receiving quality) per second. So, with respect to the information medium of image information, its enormous amount of information cannot be handled in a digital format. For example, although visual telephones have already been put to practical use by means of an ISDN (Integrated Services Digital Network) which accommodates a transmission rate ranging from 64 kbps to 1.5 Mbps, video of TV or camera cannot be directly sent over the ISDN.

Accordingly, there is a need for a compression technique for information. In case of visual telephones, a moving picture compression technique according to H 261 standard which is internationally standardized-by an ITU-T (International Telecommunication Union-Telecommunication Standardization Sector) is employed. Also, according to an information compression technique conforming to MPEG (Moving Picture Experts Group) 1 standard, audio and video information can be recorded in a normal CD (compact disc) for music.

The MPEG is an international standard for data compression of a moving picture. According to the MPEG1, moving picture data is compressed into 1.5 Mbps data, that is, TV signal information is compressed to about 1/100 information. Since a transmission rate of the MPEG1 is restricted to about 1.5 Mbps, according to MPEG2 standardized to meet demands of a higher image quality, the moving picture data is compressed into 2 to 15 Mbps data.

In status quo, MPEG4 is being standardized by a group (ISO/IEC JTC1/SC29/WG11) which has standardized MPEG1 and MPEG2. According to the MPEG4, coding image information for each object on a display screen and required signal processing can be performed, and new capabilities needed for multimedia can be provided.

According to MPEG4, for higher efficiency in coding, a display image is divided into plural regions depending on contents of a display image, and then an image signal of each region is compressively coded. The divided region is an object region for each object of a display image. Such coding method is disclosed in Japanese Published Patent Application No. Hei 2-279080 or Japanese Published Patent Application No. Hei 7-38896.

In the compressive coding described above, it is necessary to compressively code shape information of each region (region shape information) as well as a brightness signal or a color difference signal of each region. For example, chain coding is often used to code the region shape information.

In the case where the image is divided into plural regions, at a boundary between adjacent regions, these regions have shapes corresponding to negative and positive patterns in a photograph, and it is not therefore undesirable to code image signals of respective regions separately when considering efficiency in coding. In other words, if a boundary shape ot one ot the adjacent regions is known, then a boundary shape of the other region is known, so that a shape signal of one of the adjacent regions is coded, while a shape signal of the other region is coded after eliminating data indicating the boundary shape, thereby reducing amount of shape signals to be coded.

In another case where image signals of plural regions into which an image is divided and image signals of plural images to-be-composited are coded and transmitted/recorded, images of respective regions, or composition information for overlapping the respective images to-be-composited, are transmitted together with coded data of respective images. The composition information contains information indicative of relationship of order (before and behind) among the respective images to be overlapped. In decoding, image signals of respective images are coded, and then decoded image data is composited in the order of the composition information.

However, there have been several drawbacks with such prior art image coding, which are described below.

One problem is that a shape of a transformed region cannot be regenerated unless coded data of all regions of a frame is decoded and regenerated, since adjacent regions required for restoring the transformed shape are not recognized in a decoding end.

Another problem is that there is a possibility of decoding data which is not required for decoding and regenerating an image of a required region when decoding the required region or specific images to-be-composited, since the composition information only indicates the order relationship.

SUMMARY OF THE INVENTION

It is an object of the present invention to provide a digital image coding method and a digital image coding apparatus in which adjacent regions required for restoring the transformed shape in its coding process can be obtained from adjacent region lists, thereby sequentially decoding and regenerating coded data of transformed regions without the need for decoding and regenerating coded data of all regions of a frame, in a decoding end.

It is another object of the present invention to provide a digital image decoding method and a digital image decoding apparatus in which appropriate decoding can be performed to a coded image Signal which have been coded by the digital image coding method and the digital image coding apparatus.

It is still another object of the present invention to provide a data recording medium which stores a digital image coding program and a digital image decoding program for implementing the image coding method and the image decoding method in general purpose apparatuses such as personal computers or work stations.

It is a further object of the present invention to provide a data structure for image transmission in which adjacent regions required for restoring the transformed shape in its coding process can be obtained from adjacent region lists, thereby sequentially decoding and regenerating coded data of transformed regions without the need for decoding and regenerating coded data of all regions of a frame, in a decoding end.

Other objects and advantages of the invention will become apparent from the detailed description that follows. The detailed description and specific embodiments described are provided only for illustration since various additions and modifications within the spirit and the scope of the invention will be apparent to those skill in the art from the detailed description.

According to one aspect of the present invention, a digital image coding method comprises the steps of: dividing an image into plural regions each having an arbitrary shape, subjecting an image signal of a required region of the plural regions to transformation so that an arbitrary shape of the required region of a boundary between the required region and a region adjacent thereto is transformed, and compressively coding the image signal of the required region and compressively coding image signals of regions except the required region without subjecting them to transformation; generating identifiers for identifying respective regions; generating list information which describes an identifier of at least one region adjacent to the required region, which is required for restoring the transformed shape to the shape before transformation; and outputting compressively coded data in which image signals of respective regions have been compressively coded, the identifiers of respective regions, and the list information as a coded image signal. Therefore, adjacent regions required for restoring the transformed shape in its coding process can be obtained from adjacent region lists, thereby sequentially decoding and regenerating coded data of transformed regions without the need for decoding and regenerating coded data of all regions of a frame, in a decoding end.

According to another aspect of the present invention, a digital image decoding method for decoding and regenerating a coded image signal which has been compressively coded by a digital image coding method of the first aspect, comprises: a decoding step for decoding compressively coded data included in the coded image signal to regenerate image signals of respective regions, wherein a regenerated image signal of the required region is restored by a prescribed process according to list information and shape information of at least one required adjacent region which are included in the coded image signal so that a shape of the required region is restored to its arbitrary shape before transformation. Therefore, the present invention provides an image decoding method and an image decoding apparatus in which the coded image signal has been coded by the image coding method and the image coding apparatus are appropriately decoded.

In addition, the list information is added to each compressively coded data. Thereby, when regenerating a required region or image, compressively coded data required for regenerating a required region can be decoded by referring to the list, which reduces amount of data to-be-decoded, resulting in high-speed decoding.

Further, the list information is added to each compressively coded data or for each compressively coded data of a prescribed number to regenerate a required region. Thereby, it is not necessary to obtain composition information which describes overlapping relationship among respective regions required for regenerating all regions.

According to still another object of the present invention, in a data recording medium, a program for making a computer perform the digital image coding and digital image decoding is stored, and by loading the program into the computer, efficiency in coding and decoding is improved.

According to a further object of the present invention, a data structure for image transmission for transmitting a coded image signal in which a digital image signal has been coded, comprises: coded data obtained by subjecting an image signal of a required region of plural regions each having an arbitrary shape to transformation so that an arbitrary shape of the required region of a boundary between the required region and a region adjacent thereto, and compressively coding the image signal of the required region and by compressively coding an image signal of a region other than the required region without it is transformed; identifiers for identifying respective region; and list information which describes identifiers of adjacent regions required for restoring the transformed shape of the required region to its arbitrary shape before transformation. Therefore, adjacent regions required for restoring the shape which has been transformed in its coding process can be obtained from adjacent region lists, thereby sequentially decoding and regenerating coded data of transformed regions without the need for decoding and regenerating coded data of all regions of a frame, in a decoding end.

DETAILED DESCRIPTION OF THE PREFERRED EMBODIMENTS

Now, preferred embodiments of the present invention will be described with reference to FIGS. 1 to 16(a)–16(c).

[Embodiment 1]

Figure 1:
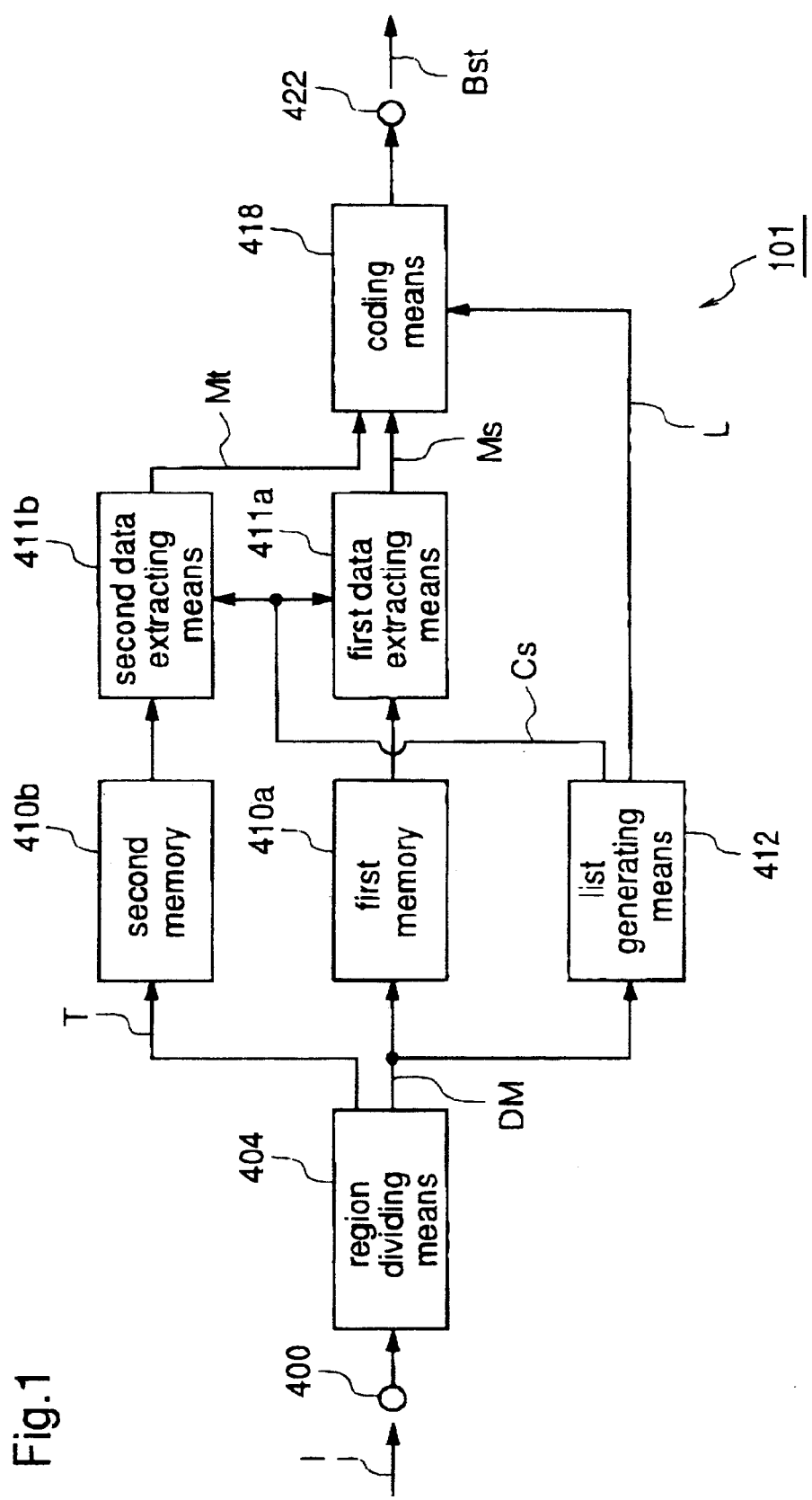
FIG. 1 is a block diagram showing a digital image coding apparatus according to a first embodiment of the present invention.

FIG. 1 is a block diagram showing a digital image coding apparatus according to a first embodiment of the present invention. First, a construction of the apparatus will be described.

Referring now to FIG. 1, there is shown a digital image coding apparatus 101, which is used to divide a digital image signal I input to an input terminal 400 into image signals corresponding to plural respective regions into which an image space formed by the image signal I is divided, and to code the image signals of respective regions for each region.

The digital image coding apparatus 101 includes region dividing means 404 for setting plural regions corresponding to respective objects each having an arbitrary shape in the image space, and generating division map information DM indicating boundaries, which has values unique to respective regions as shape sample values of pixels of respective regions in the image space. The image space indicates a frame image, and also referred to as an image hereinafter. The division map information DM is shape signals of the image space.

Figure 4:
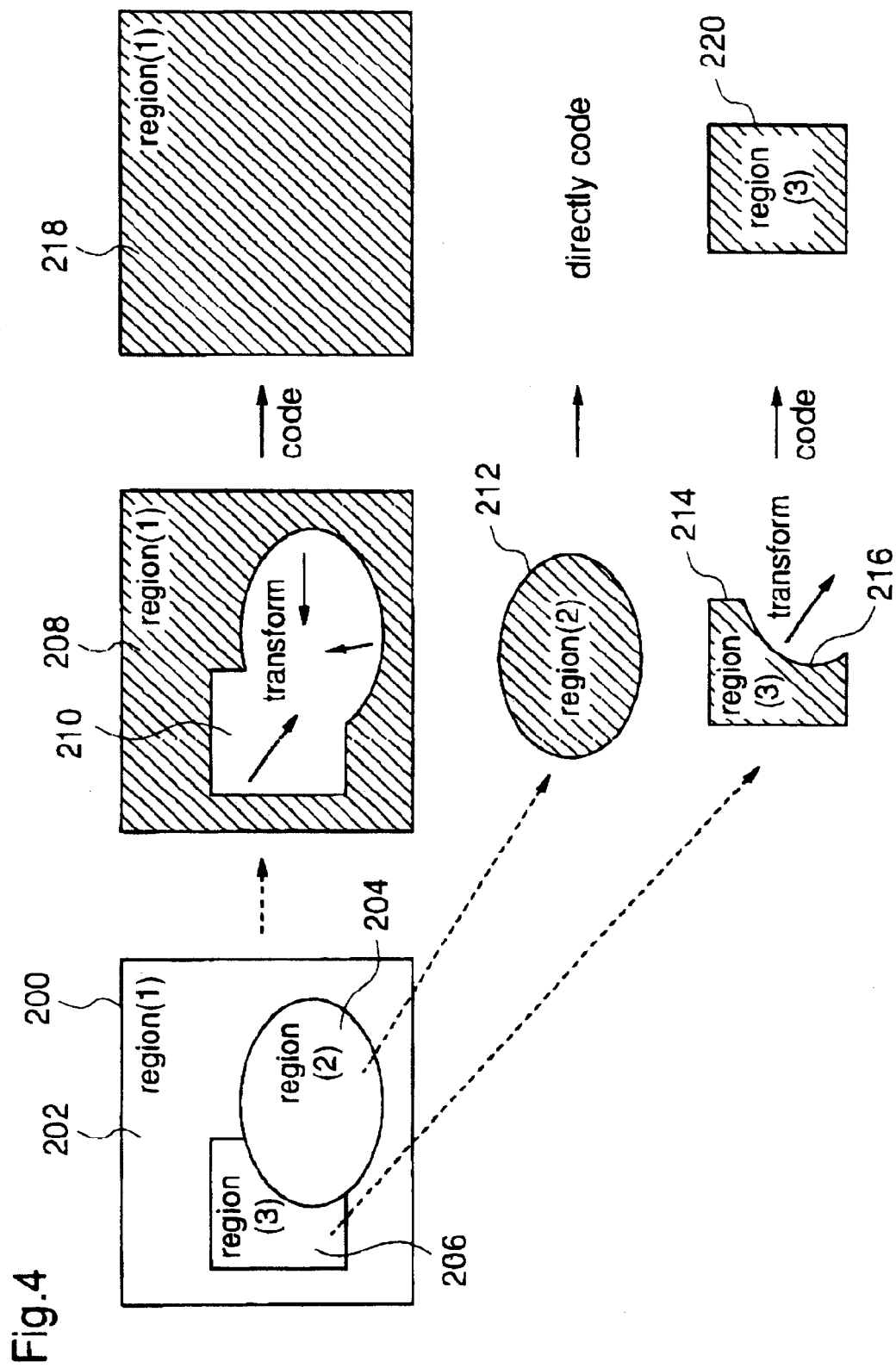
FIG. 4 is a diagram for explaining modified coding by the digital image coding apparatus of the first embodiment.

The region dividing means 404, more specifically, as shown in FIG. 4, is used for setting regions of a predetermined number (three herein) according to a standard or the like, i.e., first, second, and third regions 202, 204, and 206 corresponding to objects each having an arbitrary shape, of an. input image 200 formed by the digital image signal I.

From the region dividing means 404, the division map information DM, and the digital image signal I as a texture signal I comprising a brightness signal and a color difference signal, for hierarchical color display of the image, are output.

The digital image coding apparatus 101 further includes list generating means 412 for generating an adjacent region list which describes a region ID of each region of the input image 201, positional relationship of overlapping respective regions of the input image 201, and a region adjacent to each region according to the division map information DM.

By this list generating means 412, to the first region 202, the second region 204, and the third region 206, an ID having a value (1), an ID having a value (2), and an ID having a value (3) are given, respectively. Preferably, as these values, the sample values of the division map information DM, i.e., shape signals are used. As shown in the figure, the sample values of the. shape signals of the first, second, and third regions 202, 204, and 206 are 1, 2, and 3, respectively.

In addition, the list generating means 412 is used for allocating the second region 204 to an upper layer, the first region 202 to a lower layer, and the third region 206 to an intermediate layer between the upper and lower layers when they are overlapped, and outputting this overlapping information as a control signal Cs. Also, the overlapping is decided in such a way that with respect to divided plural regions, centers of gravity in respective regions are obtained, and then the overlapping of respective regions is determined by distances from their centers of gravity to a center of the image in descending order of closeness. It should be noted that decision on the overlapping is not limited thereto.

Subsequently, generation of an adjacent region L by the list generating means 412 will be described.

Referring to FIG. 5(b), the adjacent region list L comprises a first description-area 302 which describes an ID of a target region, and a second description area 304 which describes identifiers ID of regions adjacent. to the target region (adjacent region identifiers ID), which are respectively represented by 5 bits in fixed length.

As mentioned previously, since the input image 200 is divided into the first, second, and third regions 202, 204, and 206 (see FIG. 5(a)), and overlapping is decided in such a way that the second region 204, the third region 206, and the first region 202, are the upper layer, the intermediate layer, and the lower layer, respectively, the first and third regions 202 and 206 are supposed to be subjected to transformation (see FIG. 4). The list generating means 412 generates an adjacent region list L2 (see FIG. 5(d)), an adjacent region list L3 (see FIG. 5(e)), and an adjacent region list L1 (see FIG. 5(c)), for the second region 204, the third region 203, and the first region 206, respectively.

For instance, as shown in FIG. 4, in a case where a shape 208 of the first region 202 is transformed to a shape 218, a shape 214 of the third region 206 is transformed to a shape 220, and a shape 212 of the regions 204 is not subjected to transformation, since information required for restoring the transformed shape (shape after transformation) 220 of the third region 206 to the shape before transformation 214 is the shape of the second region 204, the value (3) of the ID of the third region 206 as a target region is described in the first description area 318 of the adjacent region list L3 of the third region 206, and the value (2) of the ID of the second region 204 is described in the second description area 320 of the list L3 as a value of an adjacent region ID. Since information required for restoring the shape after transformation 218 of the first region 202 to the shape before transformation 208 is the shape 212 of the second region 204 and the shape 214 of the third region 206, as shown in FIG. 5(c), the value (1) of the ID of the region 202 as a target region is described in the first description area 310 of the first region 202, and the value (2) of the ID of the second region 204 and the value (3) of the ID of the third region 206 are respectively described in the second description area 312 of the list L1 as values of adjacent region identifiers ID. As shown in FIG. 5(d), in the first description area 314 of the adjacent region L2 of the second region 204 before transformation, the value (2) of the ID of the region 204 is described, and in the description area 316 of the list L2, information (Null) indicating no reference region is described as a value of the ID of the adjacent region.

Alternatively, to express no reference region, description of a value of an ID in the second description area 316 may be dispensed with.

From the list generating means 412, the respective region identifiers ID, are output as region ID information, i.e., a region "1" ID, a region "2" ID, and a region "3" ID and the respective adjacent region lists L1~L3 are output as adjacent region list information, i.e., an adjacent region "1" list, an adjacent region "2" list, and an adjacent region "3" list.

Referring to FIG. 1 again, the digital image coding apparatus 101 further includes a first memory 410a for storing the division map information DM as shape signals S, first data extracting means 411a for receiving the control signal Cs and extracting a shape signal Ms of a required region from the shape signals stored in the first memory 410a according to overlapping information of the respective regions indicated by the control signal Cs, second memory for storing the texture signal T, and second data extracting means 411b for receiving the control signal Cs and extracting a texture signal Mt of the required region from signals stored in the second memory 410b according to the overlapping information.

The digital image coding apparatus 101 still further includes coding means 418, the coding means 418, for a shape signal of a required region of the plural regions, subjecting its arbitrary shape at a boundary between the required region and its adjacent region to transformation, and then compressively coding to the resulting signal, and for a shape signal of a region other than the required region, compressively coding to the shape signal without transformation, while compressively coding texture signals of respective regions correspondingly to compressive coding of the shape signals. Coded shape signals in which shape signals of respective regions have been compressively coded, and coded texture signals in which texture signals of respective regions have been compressively coded, the region ID information, and the adjacent region list information are multiplexed, and the resulting coded image signal (bit stream) Bst is output from an output terminal 422, which is transmitted/recorded.

Hereinafter, construction of the coding means 418 of the digital image coding apparatus 101 will be described.

Figure 2:
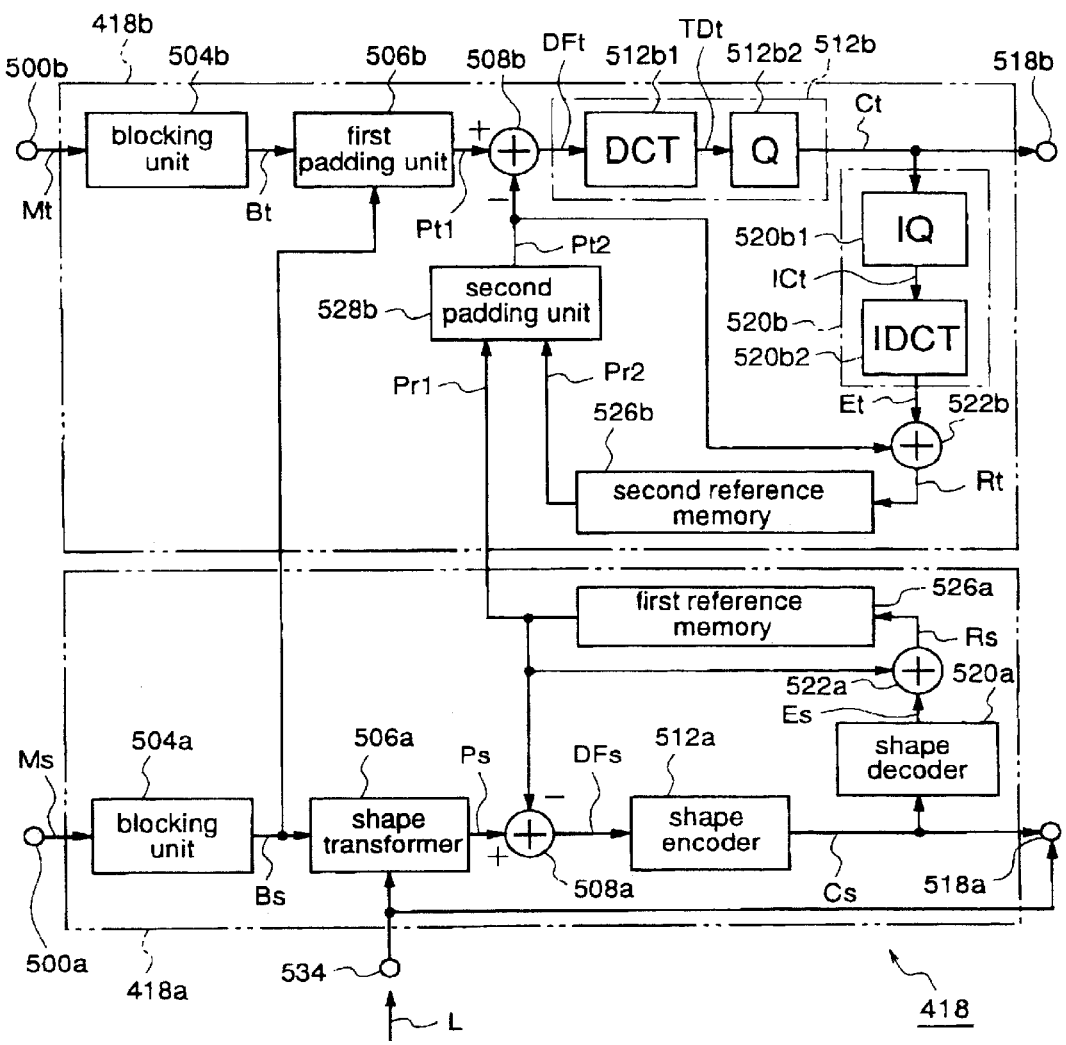
FIG. 2 is a diagram for explaining a construction and operation of shape coding means of the digital image coding apparatus of the first embodiment.

Referring to FIG. 2, the coding means 418 includes a shape coding section 418a for performing compressive coding to the shape signal Ms input to an input terminal 500a from the first data extracting means 411a, and a texture coding section 418b for performing compressive coding to the texture signal Mt input to an input terminal 500b from the second data extracting means 411b.

The shape coding section 418a includes a blocking unit 504a for dividing the shape signal Ms of a region (object region) having an arbitrary shape from the first data extracting means 411a into signals corresponding to coding unit regions (blocks) each comprising 16×16 pixels of the object region, and outputting shape signals Bs of respective blocks, and a shape transformer 506a for transforming a shape signal Bs of a target block to-be-coded according to information of the adjacent region list L from the list generating means 412.

The shape coding section 418a further includes an adder 508a for computing difference between a shape signal Pr1 of a reference block for the target block and the shape signal Bs of the target block, and a shape encoder 512a for performing shape coding to a difference value DFs from the adder 508a, and outputting a coded shape signal Cs to an output terminal 518a. For the shape coding, chain coding, quarter tree, or the like is employed.

The shape coding section 418a still further includes a shape decoder 520a for performing decoding to the coded shape signal Cs and outputting a decoded shape signal Es, and an adder 522a for adding the decoded shape signal Es to the shape signal Pr1 of the reference block to generate a regenerated shape signal Rs, and a first reference memory 526a for storing the regenerated shape signal Rs as a shape signal of a reference block for a block to-be-processed subsequent to the target block. The shape signal of the reference block is a prediction signal of the shape signal of the target block, which has been generated using motion compensation.

Meanwhile, the texture coding section 418b includes a blocking unit 504b for dividing the shape signal Mt of a region (object region) having an arbitrary shape from the second data extracting means 411b into signals corresponding to unit regions (blocks) each comprising 16×16 pixels of the object region, and outputting texture signals Bt of respective blocks, a first padding unit 506b for performing padding to the texture signal Bt of the target block in which values of pixels located outside an object in the target block are padded on the basis of the blocked shape signal Bs from the shape coding section 418a, and an adder 508b for computing a difference value DFt between a padded texture signal Pt1 and a texture signal Pt2 of a padded reference block.

The texture coding section 418b further includes a texture encoder 512b for performing compressive coding to the difference value DFt, and outputting a compressively coded texture signal Ct to the output terminal 518b, and a texture decoder 520b for performing decompressively decoding to the texture signal Ct, and outputting a restored difference value as an expanded texture signal Et. The texture encoder 512b includes a DCT (Discrete Cosine Transform) unit 512b1 for performing DCT to the difference value DFt and transforming it to a frequency component TDt, and a quantizer 512b2 for quantizing the frequency component TDt. The texture decoder 520b includes an inverse quantizer 520b1 for inversely quantizing the texture signal Ct into a frequency component ICt, and an inverse DCT unit 520b2 for performing IDCT (Inverse Discrete Cosine Transform) to the frequency component ICt, and outputting an expanded texture signal (restored difference value) Et.

The texture coding section 418b still further includes an adder 522b for adding the expanded texture signal (locally decoded texture signal) Et to texture signal Pt2 of the padded reference block and outputting a regenerated texture signal Rt, a second reference memory 526b for storing an output of the adder 522b as a texture signal of a reference block for a block to-be-processed subsequent to the target block, and a second padding unit 528b for performing padding to a texture signal Pr2 of the reference block output from the second reference memory 526b on the basis of the shape signal Pr1 of the reference block from the shape coding section 418a, and outputting a padded texture signal Pt2 of the reference block. The texture signal Pr2 of the reference block is a prediction signal of the texture signal of the target block, which has been generated using motion compensation.

Also, the coding means 418 is used for multiplexing and coding the coded shape signal, the coded texture signal, the region ID information, the adjacent region ID information, and so forth, and outputting the resulting multiplexed coded signal from the digital image coding apparatus 101 as the bit stream Bst, although these are not shown in FIGS. 1 and 2.

FIG. 6(a) shows a data structure of the coded image signal output from the digital image coding apparatus 101.

Referring to FIG. 6(a), there is shown a coded image signal (bit stream) 600a output from the image coding apparatus 101. In the coded image signal 600a, following a frame ID 600 indicating a head of each frame, data sets 600a2, 600a3, and 600a1 of the second, third, and first regions 204, 206, and 202 are aligned in this order.

The data set 600a2 of the second region 204 includes a region "2" ID 608 of the region 204, coded data 610 of the region 204, and an adjacent region "2" list 612 of the region 204. The data set 600a3 of the third region 206 includes a region "3" ID 614 of the region 206, coded data 616 of the region 206, and an adjacent region "3" list 618 of the region 206. The data set 600a1 of the first region 202 includes a region "1" ID 602 of the region 202, coded data 604 of the region 206, and an adjacent region "1" list 606 of the region 202.

Reference numeral 620 designates a frame ID indicating a head of a frame subsequent to the frame, the head of which is indicated by the frame ID 600, and reference numeral 626 designates a region "2" ID of the region 204 in the subsequent frame.

In the coded image signal 600a having such data structure, the frame ID 600 shows a starting position of a frame. In addition, the region "2" ID 608, the region "3" ID 614, and the region "1" ID 602 show starting positions of the coded data 610, 616, and 604, respectively Each of these identifiers ID is, for example, represented by a unique code of a fixed length (5 bits).

The coded data 610, 616, and 604 each includes a coded shape signal in which a shape signal of each region has been coded, and a coded texture signal in which a texture signal of each region has been coded.

From adjacent region list information of the respective regions 202, 204, and 206 (the adjacent region "1" list, the adjacent region "2" list, and the adjacent region "3" list), the list L1, L2, and L3 shown in FIGS. 5(c), 5(d), and 5(e) are obtained, respectively, which respectively show an adjacent region required for restoring a shape of a region which has been shape transformed when coded.

With the data structure of the coded image signal including the coded data of respective regions and the adjacent region list information of respective regions, all that a decoding apparatus should do to generate an image of a required region is to decode coded data of the required region and coded data of a region required for restoring the same, without the need for decoding all coded data of all regions of one frame image.

The adjacent region list information may be positioned between the region ID and the coded data in the bit stream.

While it is preferable that consecutive numbers are assigned to values of the region identifiers ID as shown in FIGS. 4 and 5(a)–(e), even numbers and odd numbers may be used.

In addition, it is required that identifiers ID be respectively described in a unique format, and assume a format establishing synchronization. Thereby, detection of an ID allows decoding of coded data of a region indicated by the ID While the data structure shown in FIG. 6(a) is for transmitting and recording coded data of respective regions and adjacent region list information for the respective regions separately, the coded data including the adjacent region list information may be transmitted and recorded. In this case, the first description area 302 may be dispensed with and adjacent region lists which describe adjacent region identifiers ID may be added to coded data of respective regions.

Next, operation of the apparatus 101 will be described.

Figure 3:
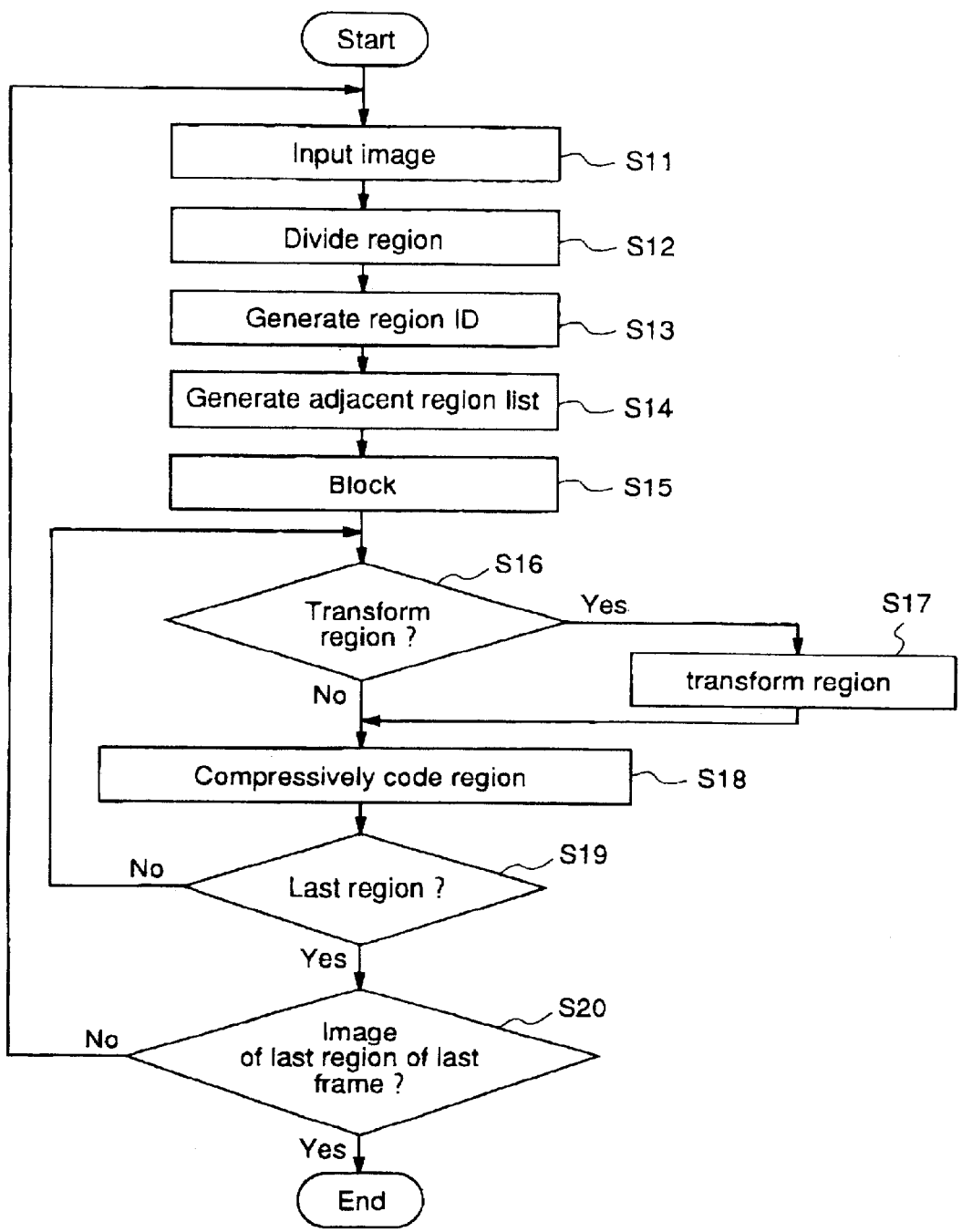
FIG. 3 is a diagram showing flow of coding by the digital image coding apparatus of the first embodiment.

FIG. 3 shows flow of coding by the apparatus 101.

Along flow in FIG. 3, when the digital image signal I is input to the apparatus 101 from the input terminal 400 (step S11), the region dividing means 404 sets plural regions of objects each having an arbitrary shape in the image space (one frame image) formed by the digital image signal I, performs division by giving numbers to respective regions, and generates the division map information DM (see FIGS. 4 and 5(a)) (step S12). The division map information DM comprises sample values set for respective pixels in the image space, indicating which of the three regions the respective pixels belong to.

Various methods of dividing region are known. These such methods are, for example, to divide a region using motion information signal of an image, to divide a region according to quality of respective pixels of an image, and to divide a region based on texture information of an image. These methods are described in detail, for example, in "N. Diehl, "Object-oriented motion estimation and segmentation in image sequences", Signal Processing: Image Communication 1991, pp23–26, Nilhil R. Pal et al, "A review on image segmentation techniques", Pattern Recognition, Vol. 26, No. 9, 1993, pp. 1227–1294."

The division map information DM is output to the first memory 410a and the list generating means 412, and the digital image signal I is directly output to the second memory 410b as the texture signal I for hierarchical color display of one frame image.

The list generating means 412 decides overlapping relationship of respective regions according to the division map information DM, and generates the adjacent region list L indicating identifiers ID for identifying respective regions and regions adjacent to the respective regions which are required for decoding and regenerating them.

More specifically, to the regions 202, 204, and 206, region numbers (1), (2), and (3) are assigned as the region identifiers ID, and as the region identification information, the region "1" ID 602, the region "2" 608, and the region "3" ID 614 are generated (step S13). Then, the adjacent region list L1 indicating adjacent regions required for decoding and regenerating the region 202, the adjacent region list L2 indicating adjacent regions required for decoding and regenerating the region 204, and the adjacent region list L3 indicating adjacent regions required for decoding and regenerating the region 206 (step S14). These lists L1~L3 are output to the coding means 418 as the adjacent region list information, i.e., the adjacent region "1" list 606, the adjacent region "2" list 612, and the adjacent region "3" list 618, respectively.

In addition, the list generating means 412 obtains centers of gravity in respective regions set in the frame image, and then determines the overlapping of respective regions by distances from their centers of gravity to a center of the image in descending order of closeness. In this embodiment, to the second region 204, the third region 206, and the first region 202, the upper layer, the intermediate layer, and the lower layer are assigned, respectively, which has been already described.

Then, the overlapping information of respective information is output to the first and second data extracting means 411a and 411b as control information Cs.

The first data extracting means 411a extracts information of respective regions from the division map information stored in the first memory 410a in the order from upper to lower layers in accordance with the control signal Cs, and outputs the shape signals Ms of respective regions to the coding means 418. The second data extracting means 411b extracts texture signals of respective regions from the texture signals stored in the second memory 410b in the order from upper to lower layers in accordance with the control signal Cs, and outputs the texture signals Mt of respective regions to the coding means 418.

In the coding means 418, the blocking unit 504a of the shape coding section 418a performs blocking to the shape signal Ms and outputs the blocked shape signals Bs of extracted regions, while the blocking unit 504*b* of the texture coding section 418*b* performs blocking to the texture signal Mt, and outputs the blocked texture signals Bt of extracted regions (Step S15).

The shape transformer 506*a* of the shape coding section 418*a* decides whether a shape signal of the target region should be transformed according to the adjacent region list L input through the input terminal 534 (Step S16). When it decides that the shape signal should be transformed, it transforms the shape signal and outputs a transformed shape signal Ps (Step S17), whereas when it decides that the shape signal should not, it directly outputs the shape signal as the signal Ps.

Thereafter, the shape coding section 418*a* performs coding to the signal Ps by chain coding, or the like, and the texture coding section 418*b* performs compressive coding to the texture signal of the target region (step S18).

More specifically, in the shape coding section 418*a*, the adder 508*a* computes the difference value DFs between the signal Ps and the reference shape signal Pr1, and, further, shape encoder 512*a* performs shape coding to the difference value DFs by chain coding or the like to generate a coded shape signal Cs, which is output to the output terminal 518*a* and decoded by the shape decoder 520*a* suitably for the coding and converted into the decoded shape signal Es.

The decoded shape signal Es is added to the reference shape signal Pr1 by the adder 522*a*, and stored in the first reference memory 526*a* as a reference shape signal Rs for a block subsequent to the target block.

In the texture coding section 418*b*, the first padding unit 506*b* performs padding to the texture signal Bt of the target block output from the blocking unit 504*b* on the basis of the shape signal Bs of the target block. To be more detailed, with respect to a texture signal including a boundary of an object, padding is performed by replacing values of pixels located outside the object with values of pixels located inside the object around the boundary, and a padded texture signal Pt1 is output, while with respect to a texture signal of a block located in the object, the signal Pt1 is directly output without being padded.

Then, the adder 508*b* computes the difference value DFt between the padded texture signal Pt1 and the reference texture signal Pt2 for the target block, and further, the information compressor 512*b* performs information compression to the difference value DFt. At this time, the DCT unit 512*b*1 transforms the difference value DFt to a frequency component (DCT component) TDt, and then, the quantizer 512*b*2 quantizes the DCT component TDt and outputs the coded texture signal Ct, which is output to the output terminal 518*b* and converted into the decompressed texture signal Et by the information decompressor 520*b* correspondingly to the information compression. In other words, in the information decompressor 520*b*, the signal Ct is restored to the DCt component ICt by the inverse quantizer 520*b*1, and restored to the signal Et by the inverse DCT unit 520*b*2.

The signal Et is added to the reference texture signal Pr2 by the adder 522*b*, and stored in the second reference memory 526*b* as the reference texture signal Rt for the block subsequent to the target block.

Then, coded shape signals Cs output from the shape coding section 418*a*, and coded texture signals Ct output from the texture coding section 418*b*, and the region ID information and the adjacent region list information output from the list generating means 412 are multiplexed, and the resulting bit stream Bst is output from the digital image coding apparatus 101.

Thereafter, a control unit (not shown) of the coding apparatus 101 decides whether a shape signal and a texture signal of a region extracted by the data extracting means are of a last region of a frame picture (step S19). When the control unit decides that they are not of the last region, the steps S16 through S19 are performs again. On the other hand, when the control unit decides that they are of the last region in step S19, it is decided whether the shape signal and the texture signal are of a last frame image (step S20), and when decided they are not, the steps S11 through S20 are performed again, whereas when decided they are, coding is completed.

The reference texture signal and the reference shape signal output from the memories 526*a* and 526*b* have been generated by motion compensation coding using texture signal and shape signal which have been already coded, although this is not shown in the figure.

In addition, the shape information from the first data extracting means 411*a* may be transformed by the shape transformer 506 so that difference between the shape sent from the first reference memory 526*a* and the same becomes zero, although this is not shown, either.

Besides, while it is preferable that the region ID information and the adjacent region list information input to the input terminal 534 are variable length coded and output, together with the coded shape signal which has been coded by the shape encoder 512, they are not necessarily variable length coded.

Further, while the texture signal is compressively coded by DCT as frequency transformation, subband coding may be employed as the frequency transformation.

Hereinafter, transformation carried out in this embodiment will be described to be more detailed.

As shown in FIG. 4, the shape 208 of the first region 200, and the shape 212 of the third region 206 are transformed.

For instance, coding of the third region 206 will be described. Since the extracted region 206 is located below the second region 204, a shape of a boundary between the regions 206 and 204 is transformed in the direction of an arrow. After this transformation, a shape 214 of the third region 206 becomes a shape 220. In case of chain coding, amount of data to-be-coded is smaller in a shape including an outline of straight lines than in a shape including an outline of curved lines. This is because the straight line is changed less than the curved line in a segment direction. Likewise, when compressively coding the shape 208 of the first region, a shape 210 of a boundary between the regions 204 and 206 is transformed. After this transformation, a shape 208 of the first region 202 becomes a shape 218.

On the other hand, the second region 204 is positioned in the uppermost layer of overlapping, and therefore, a shape 212 thereof is compressively coded without transformation.

It should be noted that this shape transformation is performed according to a shape coding method, and the shape may be transformed into a curved line in steps rather than it is transformed into the straight line as shown in FIG. 4. The important thing is that the shape transformation reduces amount of a shape to-be-coded.

While respective regions are transformed according to the overlapping relationship in the illustrated example, this transformation is not limited thereto so long as a region which has been transformed when coded is restored in its decoding process.

For instance, where the shape 212 of the second region 204 is transformed, the first region 202 or the third region 206 adjacent thereto, the shapes of which are coded without being transformed. In this case, when decoding and regenerating an image of the second region 204, the first region 202 or the third region 206 are used to restore the transformed shape of the second region 204 to the shape 212 before transformation.

Figure 5:
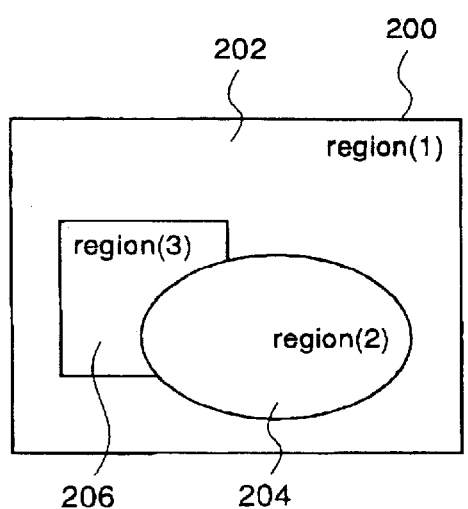
FIGS. 5(a)–5(e) are diagrams showing a structure of list information for use by coding by the digital image coding apparatus of the first embodiment.
Figure 5:
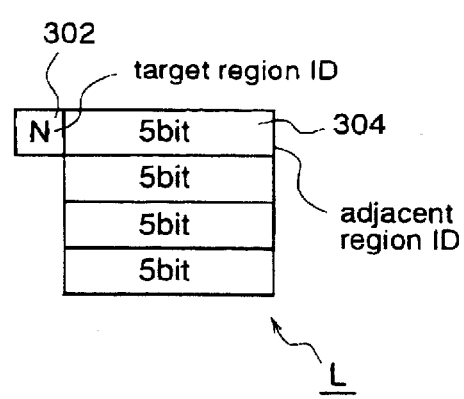
Figure 5:
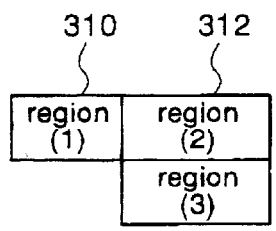
Figure 5:
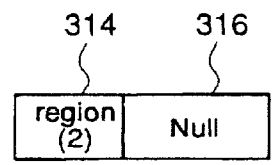
Figure 5:
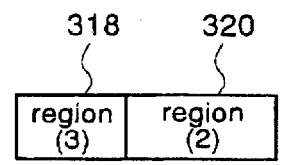

Thus, a shape of a region which has been transformed when coded is restored using information of adjacent regions which have not been transformed, in which case, adjacent region information, i.e., list information, becomes necessary. As the list information, the adjacent region lists L1~L3 for the first to third regions shown in FIG. 5 are used.

As thus far described, in the first embodiment, the input image 202 is divided into the first, second and third regions 202, 204, and 206, the first and third regions 202 and 206 are shape transformed and then compressively coded, the second region 202 is compressively coded without shape transformation, adjacent region lists L1 and L3 which respectively describe identifiers ID of adjacent regions required for restoring the transformed shapes of the first and third regions to ones before transformation, and the adjacent region list information is output together with coded data of respective regions. Therefore, in the decoding end, the adjacent region for restoration is known from the adjacent region list. Thereby, coded data of the transformed regions can be sequentially decoded and regenerated without the need for decoding and regenerating coded data of all regions of a frame.

In addition, although in the first embodiment the data structure (see FIG. 6a) has been shown, in which data sets of respective regions of a frame picture are transmitted in the overlapping order from upper to lower, data sets 600a1~600a3 of respective regions may be aligned as shown by a coded image signal 600b in FIG. 6(b), irrespective of the overlapping relationship.

Yet in addition, the coded image signal may be a coded image signal 600c (see FIG. 6(c)) of a data structure in which the adjacent region "1" list 606, the adjacent region "2" list 612, and the adjacent region "3" list 618 may be aligned between the frame ID 600 and the region "1" ID 602 as a list group 601.

In this case, a data set 600c1 of the first region 202 comprises the region "1" ID 602 and the coded data 604 of the region 202, a data set 600c2 of the second region 204 comprises the region "2" ID 608 and the coded data 610 of the region 204, and a data set 600c3 of the third regions 206 comprises the region "3" ID 614 and the coded data 616 of the region (3) 206.

When decoding the coded image signal 600c of such data structure, an adjacent region required for restoring the transformed shape to a shape before transformation is obtained from the list group 601 following the frame ID 600, decoding of data of unnecessary region is dispensed with.

Figure 7:
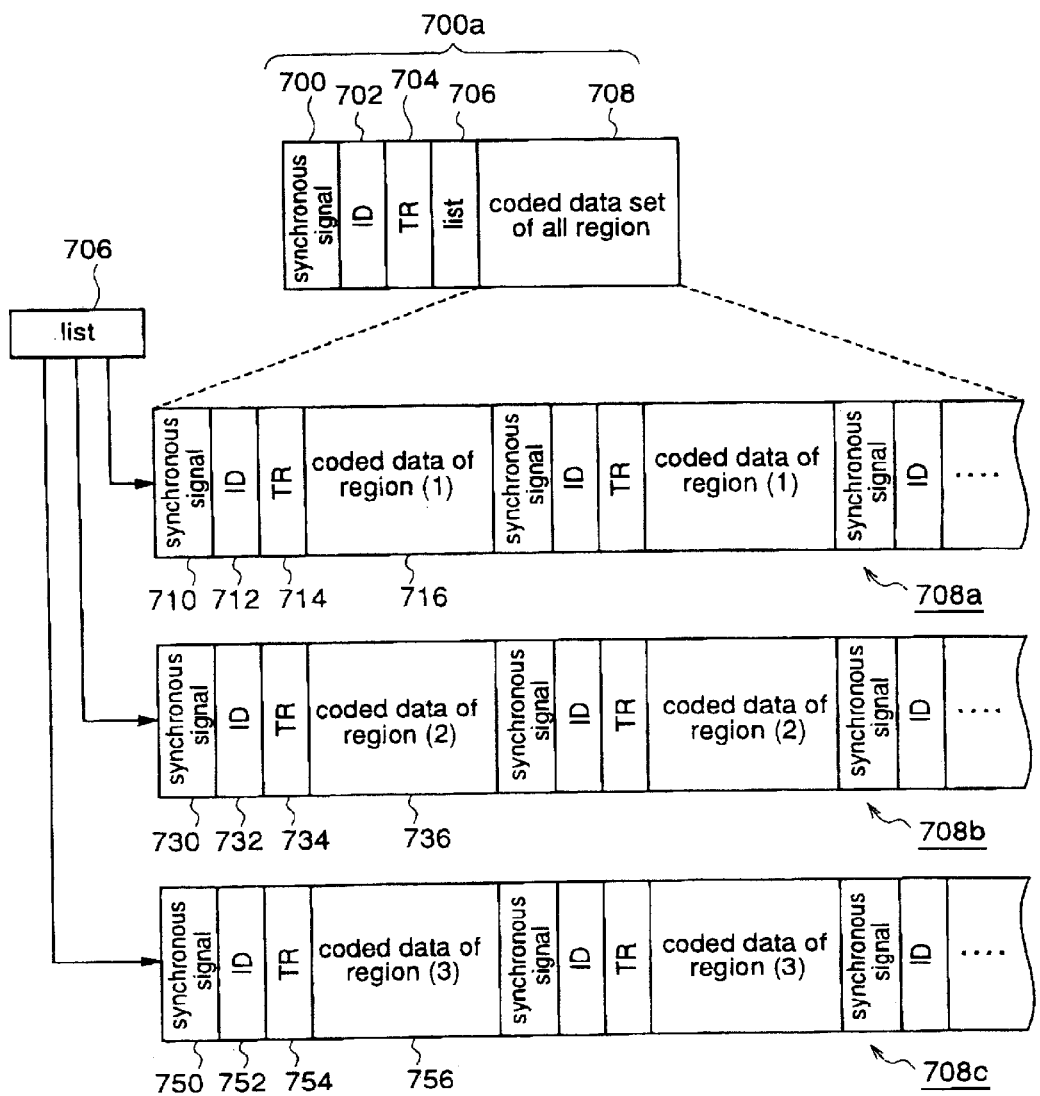
FIG. 7 is a diagram showing another data structure of a coded image signal generated by the digital image coding apparatus of the first embodiment.

FIG. 7 shows another data structure of the coded image signal output from the image coding apparatus 101.

The coded image signal 700a is created as follows.

When an input image is divided into plural regions each having an arbitrary shape, and then image signals of respective regions are compressively coded, to be transmitted/stored, a synchronous signal 700, a region ID 702, a time ID 704, and a list group 706 are added to coded data set 708 of all regions of the input image.

In the coded image signal 700a, following the synchronous signal 700, aligned is a data ID 702, which shows a starting point of image data. Following the data ID 702, aligned is a time ID 704, which shows a display starting time of image data.

Following the time ID 704, aligned is the list group 706 which describes identifiers ID of adjacent regions required for restoring a transformed region to a shape before transformation when decoding and regenerating coded data of respective regions. The list group 706 has the same structure as the list group 601 shown in FIG. 6(c). The synchronous signal 700 and identifiers ID 702, and 704 are respectively represented by a unique code of fixed length of 5 bits, for example.

The coded data set 708 includes a data stream 708a of the first region 202 in FIG. 5(a), a data stream 708b of the second region 204 in FIG. 5(a), and a data stream 708c of the third region 206 in FIG. 5(a).

The data stream 708a comprises data sets of the number of frames, each including a synchronous signal 710 of each frame of the first region 202, an ID 712 for identifying the region 202, a time ID (TR) 714 indicating a display starting time for displaying the region data, and coded data 716 of the first region 202.

Likewise, the data stream 708b comprises data sets of the number of frames, each including a synchronous signal 730 of each frame of the second region 204, an ID 732 for identifying the region 204, a time ID (TR) 734 indicating a display starting time for displaying the region data, and coded data 736 of the second region 204.

Also, likewise, the data stream 708c comprises data sets of the number of frames, each including a synchronous signal 750 of each frame of the third region 206, an ID 752 for identifying the region 206, a time ID (TR) 754 indicating a display starting time for displaying the region data, and coded data 756 of the third region 206.

In the coded image signal 700a, coded data of respective regions is aligned to a last frame of the coded data set 708 in the same manner. Thus created coded image signal may be transmitted and stored.

In the coded image signal 700a, required regions are identified by the identifiers ID 712, 732, and 752 for decoding coded data of respective regions.

In addition, when coded data of an adjacent region for restoring a required region to a shape before transformation, identifiers ID of its adjacent regions are obtained by referring to the list group 706.

Coded data of an adjacent region having the same time ID as that added to coded data of the required region is obtained, thereby restoring and regenerating the required region. For instance, coded data of the second region 204 having the time ID 734 indicating the same time as the time ID 754 of the third region 206 is obtained as coded data of an adjacent region, to restore the shape of the region 206.

The coded image signal 700a having such data structure, it is possible that coded data of respective regions is decoded in parallel by plural decoders. It is also possible that coded data of a required region and regions required for restoring its shape are decoded by referring to the list group 706.

Besides, in a case where there is no coded data of an adjacent region having the same time ID, it is possible to use coded data of an adjacent region having the closest time ID.

While coded data of each region is continuously aligned in the illustrated example in FIG. 7, data of the same region is not necessarily continuous. In other words, in the coded data set 708, the plural data sets in each of the data streams 708a~708c of the first to third regions, may be aligned for each region, or may be aligned irrespective of a region.

Further, in the coded image signal 700a in FIG. 7, the list group 706 may contain information of a display starting time of each region. In this case, an ID of a region of a display starting time, for example, the ID 732 of the region 204 is specified from the list group 706, and then the region 206 is shape restored and decoded, to regenerate an image of the region 206. In this case, therefore, a time ID subsequent to an ID of each region is not always necessary.

FIG. 8(a) illustrates another example of a data structure of a coded image signal created by the image coding apparatus 101.

Shown in FIG. 8(a) is a coded image signal 1500a.

The coded image signal 1500a comprises coded data of each region, a region ID (not shown), and list information.

The coded data is created as follows. An image is divided into plural regions each having an arbitrary shape, an arbitrary shape of a target region at a boundary between the target region and a region adjacent thereto is transformed, and an image signal of the transformed target region is compressively coded. The region ID is used for identifying the target region, and the list group includes adjacent region lists for all regions, which respectively describe identifiers ID of adjacent regions required for restoring the transformed target region to a shape before transformation.

Referring to FIG. 8(b), reference numerals 1520 and 1526 designate uncoded images of intra-frame coded data 1502 and inter-frame coded 1504, respectively. The intra-frame coded data 1502 is created by coding the image 1520 using intra-frame information. On the other hand, the inter-frame coded data 1504 is created by coding a target image using image information before and behind in time by a coding method such as motion compensation coding, to reduce amount of data to-be-coded. More specifically, since the inter-frame coded data 1504 is created by performing motion compensation coding an image signal of the image 1526 using an image signal of the image 1520, the intra-frame coded data 1502 becomes necessary to decode the inter-frame coded data 1504.

So, where there are thus variations in positions of respective regions in an image with a lapse of time, the list group including adjacent region lists which describe all adjacent regions for respective regions, and the resulting list groups 1500, and 1512 are added before intra-frame coded data in the coded image signal 1500a.

Referring to FIG. 8(b) again, in the image 1520 of a current frame, a region (A) 1522 is not adjacent to a region (B) 1524, and therefore, it is not necessary to decode information of the region (A) when regenerating the region (B). On the other hand, in the image 1526 of a subsequent frame, the region (A) 1522 overlaps the region (B) 1524.

For instance, when the region (A) 1528 of the subsequent frame is restored by referring to the region (B) 1530, information of the region (B) 1530 becomes necessary, and therefore, in order to restore and regenerate the region (A) 1528 of the subsequent frame image 1526 of the inter-frame coded data 1504, it is required that information of the region (B) 1524 of the current frame image 1520 of the intra-frame coded data 1502 be decoded in advance.

The list groups 1500, and 1512 are added to data groups 1500a1 and 1500a2 each comprising coded data of plural frame images, respectively. The list groups 1500 and 1512 each describes identifiers ID of all regions in the frame images of the corresponding group, which are to be referred to when decoding a target region.

Since the region (B) 1524 is not adjacent to the region (A) 1522 in the current frame image 1520, and the region (B) 1530 is adjacent to the region (A) 1528 in the subsequent frame image 1526, in the list group 1500, to an adjacent region list required for regenerating the region (A) 1522, an ID of the region (B) 1524 is added. As a result, coded data of the region (A) 1522 in the current frame image 1520 and coded data of the region (B) 1524 in the image 1520 are simultaneously decoded.

Thereby, if the region (B) 1530 in the subsequent frame image 1526 becomes necessary to decode and regenerate coded data of the region (A) 1528 in the subsequent frame 1526, it is possible to decode coded data of the region (B) 1530 according to information (regenerated data) of the region (B) 1524, and restore the region (A) 1528 to a shape before transformation.

Preferably, the list groups are respectively added before or after intra-frame coded data. When decoding and regenerating a coded image signal of a target region, coded data of the target region and coded data of all adjacent regions required for restoring the target region to a shape before transformation are decoded by referring to the list group on the basis of the intra-frame coded data.

As a result, when decoding coded data of respective regions in the current frame which has been inter-frame coded, it is not necessary to decode coded data of adjacent regions in previous frames, resulting in improved decoding efficiency.

While in the first embodiment, the digital image coding apparatus which performs coding to shape signals and texture signals of respective regions in a frame image and outputs a bit stream including coded shape signals and coded texture signals of respective regions has been described, it may output a bit stream including only the coded shape signals as coded signals of respective regions.

[Embodiment 2]

Figure 9:
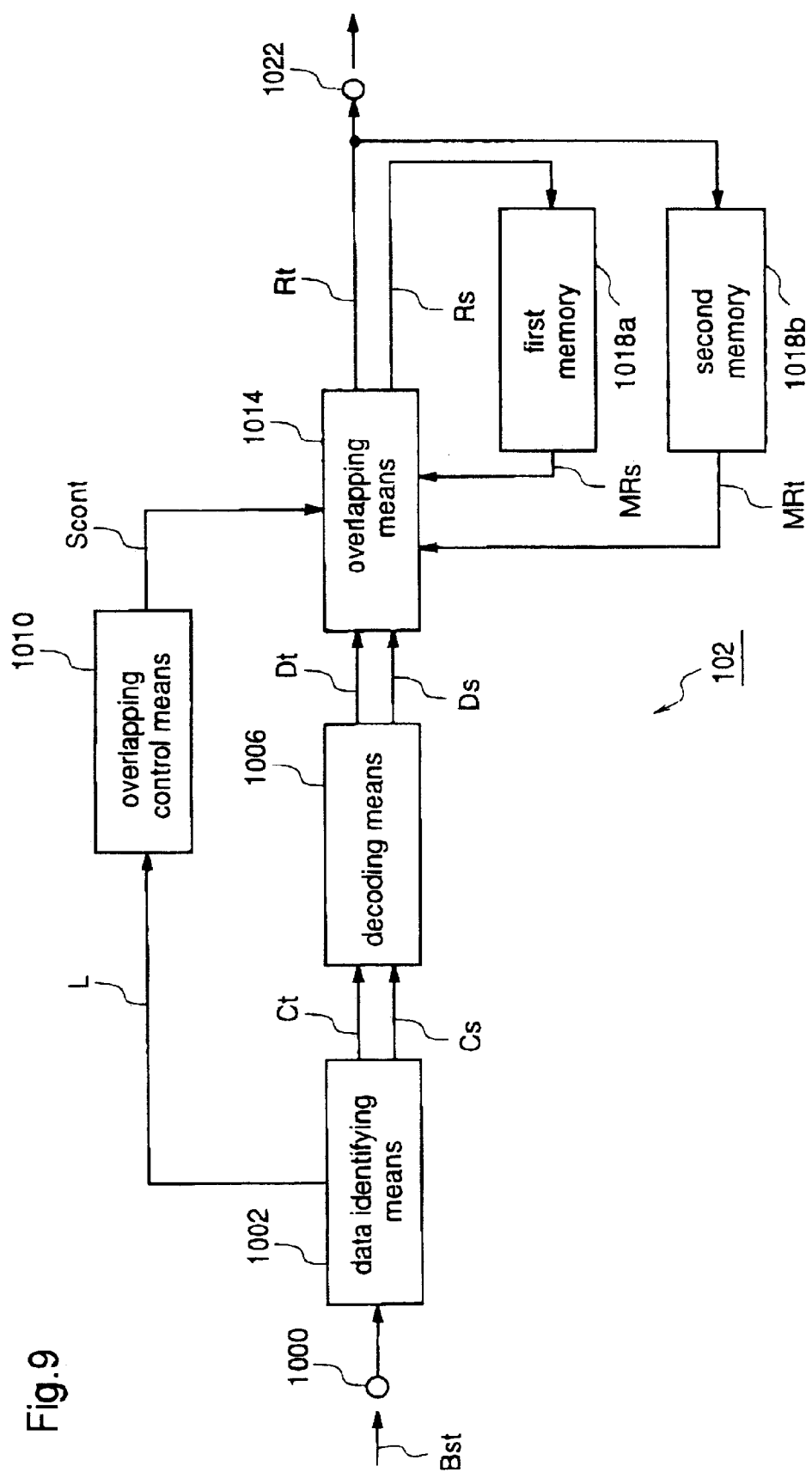
FIG. 9 is a block diagram showing a digital decoding apparatus according to a second embodiment of the present invention.

FIG. 9 is a block diagram illustrating a digital image decoding apparatus according to a second embodiment of the present invention.

In FIG. 9, reference numeral 102 designates a digital image decoding apparatus according to the second embodiment, and this apparatus 102 decodes and regenerates a coded image signal 600a output from the digital image coding apparatus 101 according to the first embodiment.

To be specific, the image decoding apparatus 102 includes a data identifying means 1002 which receives a coded image signal (a bit stream Bst) obtained by coding an image signal by the image coding apparatus 101, and identifies coded texture signals Ct, coded shape signals Cs, and adjacent region list information L; and a decoding means 1006 which decodes the coded texture signals Ct and the coded shape signals Cs to generate decoded texture signals Dt and decoded shape signals Ds of regions corresponding to the respective objects having arbitrary shapes in one frame image.

Further, the image decoding apparatus 102 includes an overlapping means 1014 which overlaps the decoded texture signals Dt and the decoded shape signals Ds corresponding to the respective regions to generate a regenerated texture signal Rt and a regenerated shape signal Rs corresponding to one frame image; an overlapping control means 1010 which controls the overlapping means 1014 with a control signal Scont according to the adjacent region list information L; a first memory 1018a which stores the regenerated shape signal Rs; and a second memory 1018b which stores the regenerated texture signal Rt. The overlapping means 1014 is constructed so that it subjects a decoded shape signal Ds and a decoded texture signal Dt in each region to shape-restoration, and outputs a regenerated shape signal Rs and a regenerated texture signal Rt in that region toward the corresponding memories 1018a and 1018b, respectively.

Further, the image decoding apparatus 102 has an external input terminal 1000 and an output terminal 1022.

Figure 10:
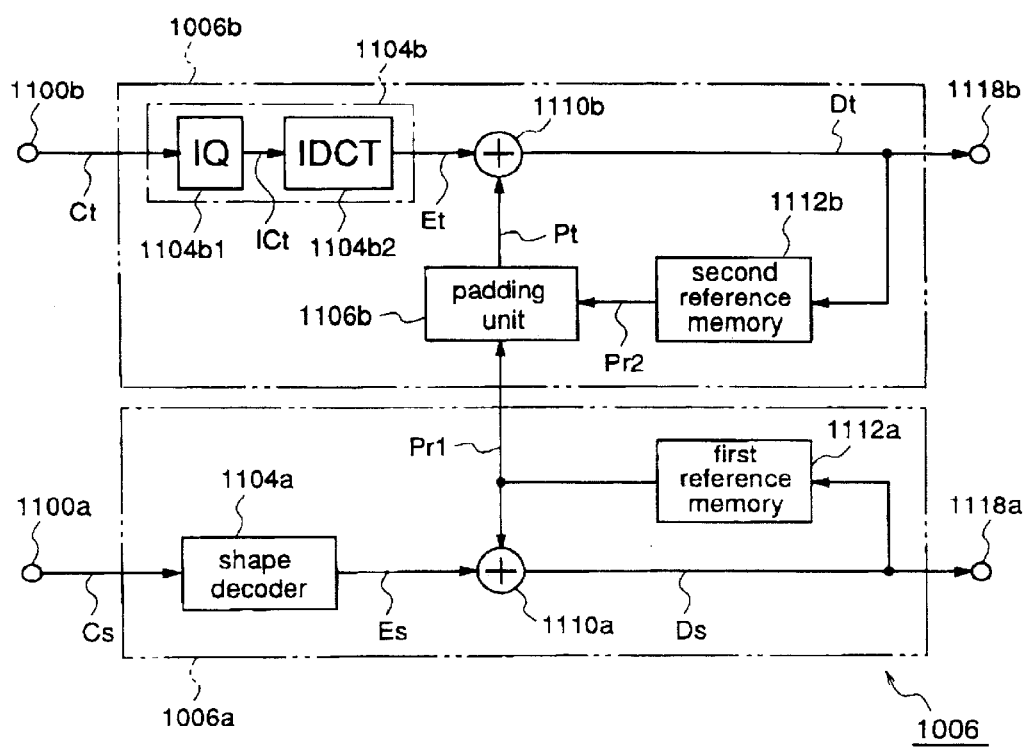
FIG. 10 is a diagram for explaining a construction and operation of shape decoding means of the digital image decoding apparatus of the second embodiment.

FIG. 10 is a block diagram showing the decoding means 1006 in more detail.

The decoding means 1006 comprises input terminals 1100a and 1100b; a shape decoding unit 1006a which decodes a coded shape signal Cs of each block supplied from the data identifying means 1002 to the input terminal 1100*a*; and a texture decoding unit 1006*b* which decompressively decodes a coded texture signal Ct of each block supplied from the data identifying means 1002 to the input terminal 1100*b*.

The shape decoding unit 1006*a* comprises a shape decoder 1104*a* which subjects a coded shape signal Cs of a target block (a block to be decoded) to shape decoding corresponding to the above-described chain coding or the like, and outputs a decoded shape signal Es of the target block; an adder 1110*a* which adds the decoded shape signal Es and a prediction signal Pr1 corresponding to the target block, and outputs a regenerated shape signal Ds of the Large block toward the output terminal 1118*a*; and a first reference memory 1112*a* which stores the regenerated shape signal Ds of the target block as a prediction signal for a block subsequent to the target block.

Further, the texture decoding unit 1006*b* comprises a texture decoder 1104*b* which subjects a coded texture signal Ct of a target block to data decompression corresponding to the above-described data compression; a padding unit 1106*b* which performs padding of a prediction signal Pr2 for the target block according to the shape prediction signal Pr1 from the first memory 1112*a* to generate a padded prediction signal Pt; an adder 1110*b* which adds the decoded texture signal Et of the target block output from the decoder 1104*b* and the padded prediction signal Pt, and outputs a regenerated texture signal Dt of the target block toward the output terminal 1118*b*; and a second reference memory 1112*b* which stores the regenerated texture signal Dt of the target block as a prediction signal for a block subsequent to the target block.

The texture decoder 1104*b* comprises an inverse quantizer 1104*b*1 which subjects the coded texture signal Ct to inverse quantization; and an inverse DCT unit 1104*b*2 which subjects the output ICt from the inverse quantizer 1104*b*1 to inverse DCT.

Figure 11:
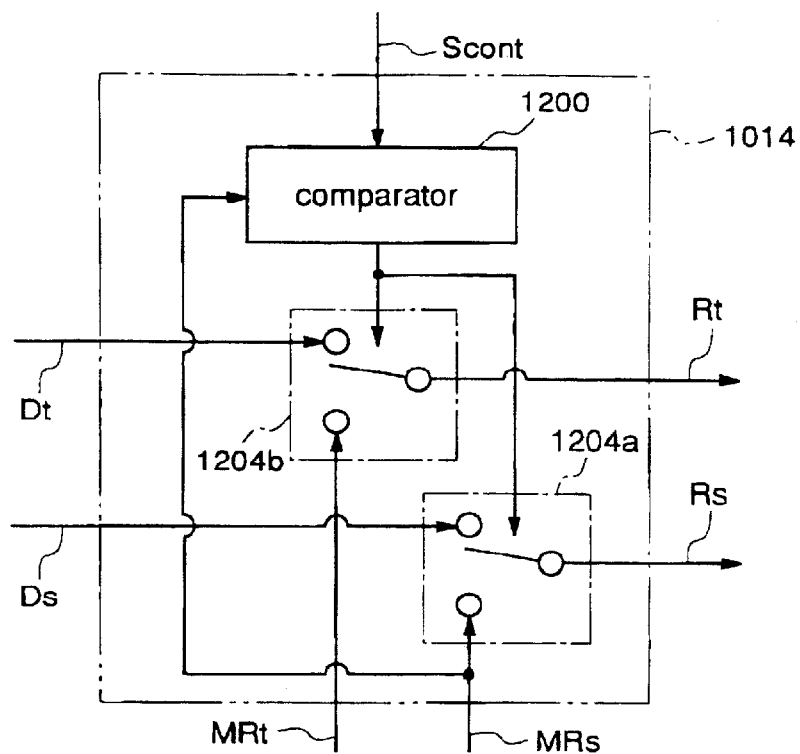
FIG. 11 is a diagram for explaining a construction and operation of overlapping means of the digital image decoding apparatus of the second embodiment.

FIG. 11 is a block diagram illustrating the overlapping means 1014 in more detail.

The overlapping means 1014 comprises a shape switch 1204*a* which selects either the decoded shape signal Ds supplied from the decoding means 1006 or the regenerated shape signal MRs read from the first memory 1018*a*; a texture switch 1204*b* which selects either the decoded texture signal Dt supplied from the decoding means 1006 or the regenerated shape signal MRt read from the second memory 1018*b*; and a comparator 1200 which compares the regenerated shape signal MRs read from the first memory with the control signal Scount output from the overlapping means 1010, and controls the switches 1204*a* and 1204*b* according to the result of the comparison.

The overlapping control signal Scont indicates which region of the input image includes the decoded shape signal being supplied from the first memory 1018*a* to the overlapping means 1014. The overlapping control means 1010 supplies the comparator 1200 with a signal having the same value as the identifier of the region including the decoded shape signal being supplied from the first memory 1018*a* to the overlapping means 1014 at the point of time.

Hereinafter, the operation of the image decoding apparatus 102 will be described using a flowchart shown in FIG. 12.

Figure 6:
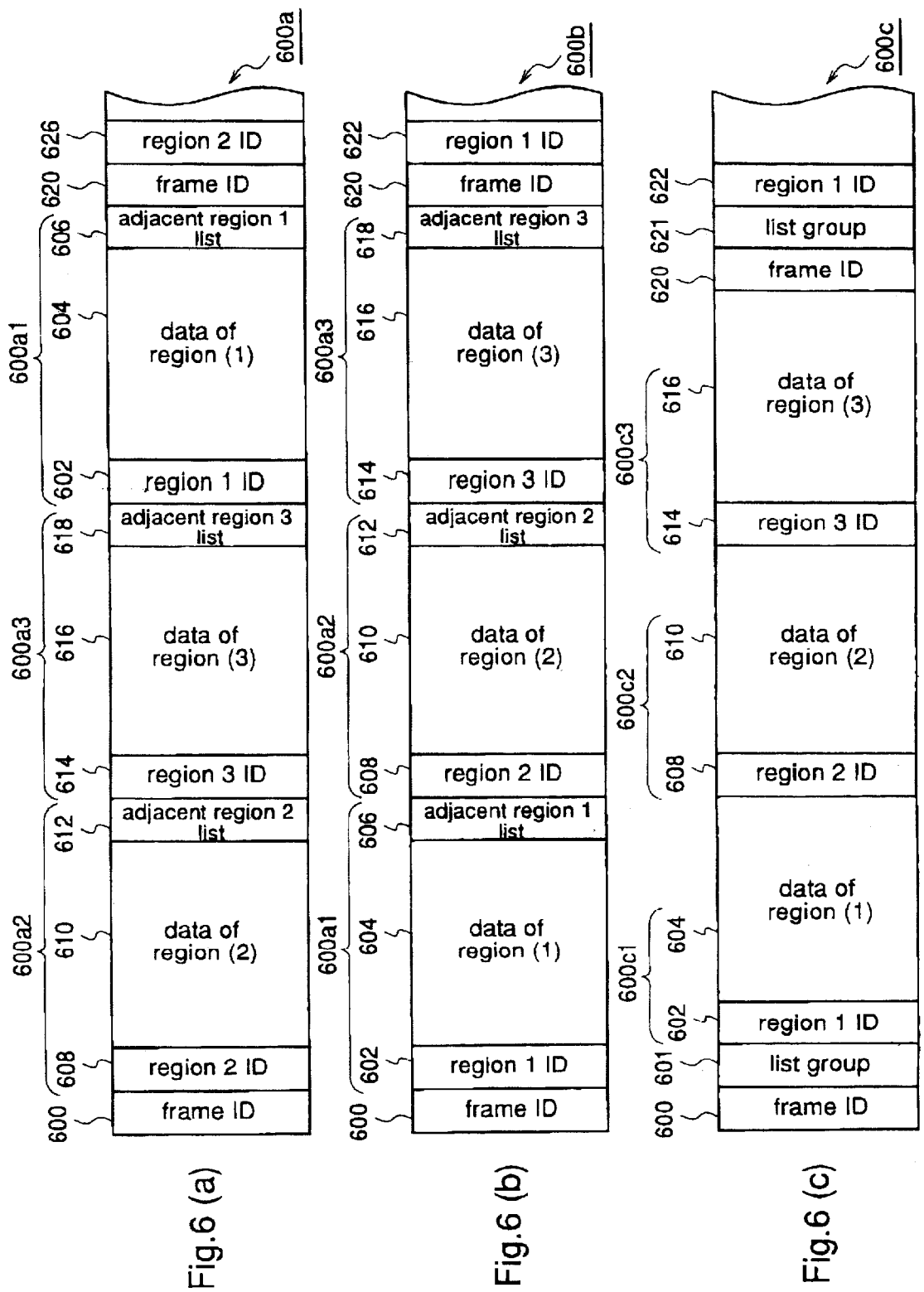
FIGS. 6(a)–6(c) are diagrams showing data structures of coded image signals generated by the digital image coding apparatus of the first embodiment.

When the coded image signal 600*a* having the data structure shown in FIG. 6(*a*) is input to the input terminal 1000 as a bit stream Bst (step S82), the data identifying means 1002 separates, from the coded image signal 600*a*, the coded shape signals Cs and the coded texture signals Ct, which signals are compressively coded data, and the adjacent region list information L containing identifiers of adjacent regions required for restoring the respective regions decoded to their states before transformation (step S83).

The coded shape signals Cs and the coded texture signals Ct are decoded by the decoding means 1006 (step S84). If necessary, these coded signals are initially subjected to variable-length decoding.

To be specific, the coded shape signal Cs of each block, which has been input to the input terminal 1100*a* and subjected to variable-length decoding, is decoded by shape decoding corresponding to a coding process such as chain coding, in the shape decoder 1104*a*. Since the shape information Es of the decoded target block is a difference signal, it is added to the shape prediction signal Pr1 corresponding to the target block and supplied from the first reference memory 1112*a* in the adder 1110*a*, and the result of the addition is output as a regenerated shape signal Ds toward the output terminal 1118*a*. The shape prediction signal Pr1 is desired to be generated by motion compensation of the shape information stored in the first reference memory 1112*a*, although the process thereof is not shown in FIG. 12.

The shape signal Ds so regenerated is stored in the first reference memory 1112*a* as a shape prediction signal for a block subsequent to the target block.

On the other hand, the coded texture signal Ct of each block, which has been input to the input terminal 1100*b* and subjected to variable-length decoding, is decoded by data decompression corresponding to the above-described data compression, in the texture decoder 1104*b*. To be specific, the coded texture signal Ct is subjected to inverse quantization in the inverse quantizer 1104*b*1, subjected to inverse DCT in the inverse DCT unit 1104*b*2, and output as a decompressed texture signal Et.

Since the texture information (decompressed texture signal) Et of the decoded target block is a difference signal, it is added to the padded texture prediction signal Pt corresponding to the target block in the adder 1110*b*, and the result of the addition is output as a regenerated texture signal Dt toward the output terminal 1118*b*.

The texture signal Dt so regenerated is stored in the second reference memory 1112*b* as a texture prediction signal for a block subsequent to the target block. The texture prediction signal Pr2 is desired to be generated by motion compensation of the texture information stored in the second reference memory 1112*b*, although the process thereof is not shown in FIG. 12.

The texture prediction signal Pr2 read from the second reference memory 1112*b* is padded according to the shape prediction signal Pr1 read from the first reference memory 1112*a*, and sent to the adder 1110*b* as the padded prediction texture signal Pt.

The regenerated shape signal Ds and the regenerated texture signal Dt are sent to the overlapping means 1014.

Meanwhile, the adjacent region list information L is sent to the overlapping control means 1010, wherein an overlapping control signal Scont is generated according to the adjacent region list information. This control signal Scont is sent to the overlapping means 1014.

In the overlapping means 1014, the regenerated shape signal Ds from the decoding means 1006 and the regenerated shape signal MRs from the first memory 1018*a* are overlapped according to the control signal Scont, and the regenerated texture signal Dt from the decoding means 1006 and the regenerated texture signal MRt from the second memory 1018*b* are overlapped according to the control signal Scont (step S85). Thereby, a shape signal Rs and a texture signal Rt corresponding to a new overlapped image are generated, and these signals are stored in the first and second memories 1018a and 1018b, respectively. This overlapping process is performed for all of the plural regions constituting one frame.

To be specific, the overlapping means 1010 receives the shape signal MRs and the texture signal MRt corresponding to an overlapped image from the first and second memories 1018a and 1018b, and the overlapping control signal Scont from the overlapping control means 1010. The overlapping control signal Scont indicates which region of one frame image includes the regenerated shape signal and the regenerated texture signal presently being input to the overlapping means 1014, with the value of the identifier of each region. The sample value of the shape signal corresponding to each region of the overlapped image stored in the first memory 1018a is identical to the value of the identifier of each region.

In the comparator 1200 included in the overlapping means 1014, the value of the overlapping control signal Scont is compared with the sample value of the shape signal of the overlapped image in the first memory 1018a. When these values are identical, the switches 1204a and 1204b select the regenerated shape signal MRs and the regenerated texture signal MRt supplied from the memories 1018a and 1018b, respectively. If these values are not identical, the switches 1204a and 1204b select the regenerated shape signal Ds and the regenerated texture signal Dt from the decoding means 1006, respectively.

Preferably, after all of the regions constituting one frame have been overlapped, the shape signals and the texture signals corresponding to the overlapped image and stored in the memories 1018a and 1018b are output from the output terminal 1022, and then the information stored in the memories 1018a and 1018b is set to zero.

The control of the overlapping means may be carried out according to the result of operation based on a conditional expression with an identifier of each region and an adjacent region list corresponding to each region being variable. Alternatively, it may be carried out according to the result of operation in which a sample value of the regenerated shape signal corresponding to each region and a value of the overlapping control signal Scont are operated using a logical expression.

Furthermore, it is possible to decode and regenerate a required region as follows. That is, a control signal designating a required region is input to the overlapping control means or the data identifying means, and only the required region and an adjacent region required for restoring the decoded required region to its state before transformation are subjected to decoding and, thereafter, the required region is overlapped with the adjacent region to generate a texture signal corresponding to a desired overlapped image.

Figure 12:
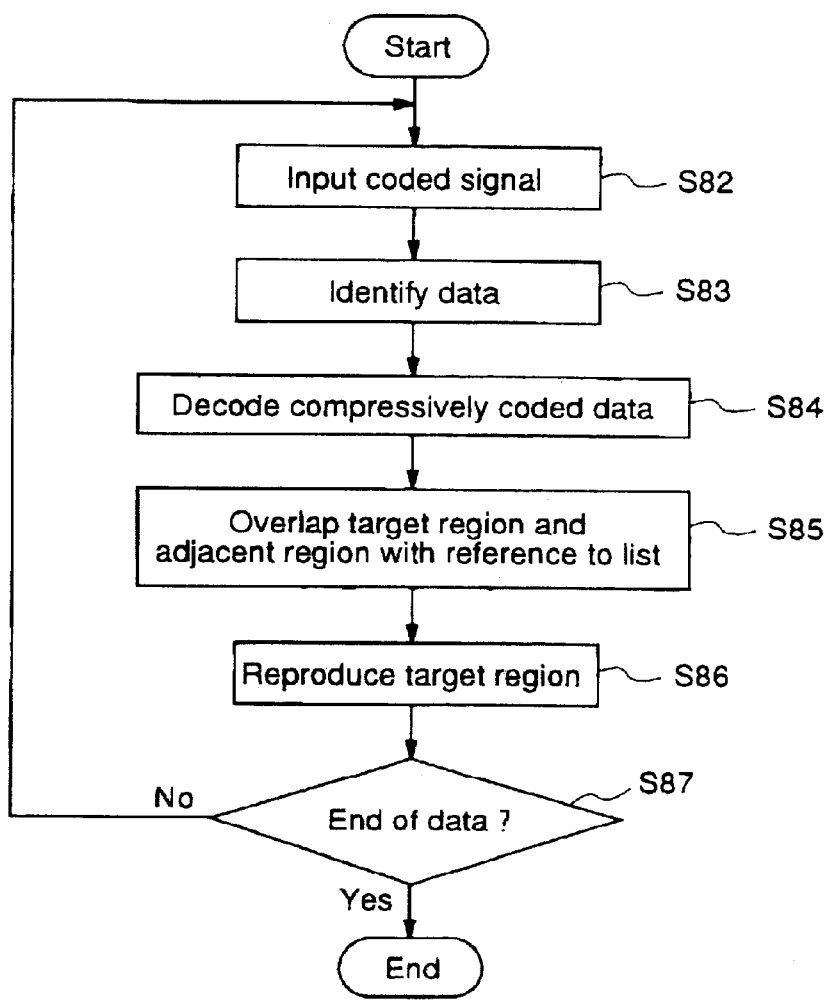
FIG. 12 is a diagram for explaining flow of decoding by the digital image decoding apparatus of the second embodiment.

Turning to FIG. 12, the shape signal and the texture signal in each region, the shape of which has been restored, are regenerated (step S86). Preferably, this regeneration is carried out when the shapes of all regions have been restored. However, as desired, only a required region may be regenerated when the required region has been restored.

In a decoding control unit (not shown) of the image decoding apparatus 102, it is decided whether or not the coded shape signal and the coded texture signal, which are being subjected to decoding, correspond to the last frame in one image stream (step S87). The above-described steps S82~S87 are repeated until the last frame is processed.

Hereinafter, the shape restoring method in the above-described decoding process will be complemented using FIG. 13.

Figure 13:
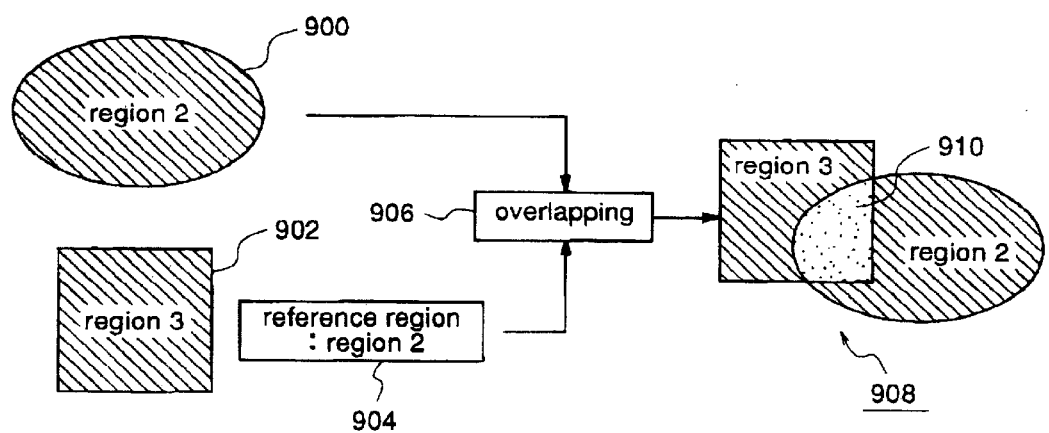
FIG. 13 is a diagram for explaining overlapping in decoding by the digital image decoding apparatus of the second embodiment.

In FIG. 13, the shape 900 of the region (2) is obtained by decoding the coded shape signal of the second region 204 (see FIG. 4) which is referred to for restoring the shape 902 of region (3) to its state before transformation, and the shape 902 of the region (3) is obtained by decoding a coded shape signal which is obtained by transforming the shape 214 of the third region 206 (see FIG. 4) and coding its shape signal.

By overlapping the region (2) and the region (3) in the overlapping step 906, an overlapped region 908 is obtained. A dotted portion 910 of the overlapped region 908 is a portion where the region (2) having the shape 900 and the region (3) having the shape 902 are overlapped.

The coded data of the region (3) having the shape 902 is given an adjacent region list 904 containing an identifier of an adjacent region required for restoring the shape of this region to that before transformation. In the reference region of this list, the identifier of the region (2) is described as an identifier of an adjacent region. Therefore, the shape information of the overlapped portion 910 between the regions 901 and 902 is included in the decoded shape signal corresponding to the region (2).

Accordingly, in the overlapped portion 910 of the overlapped region 908, the shape 902 obtained by decoding the coded shape signal of the transformed region (3) can be restored to the arbitrary shape 216 before transformation (see FIG. 4) by selecting the decoded shape signal of the region (2).

The process of restoring the shape of a desired region by overlapping the respective regions is implemented by performing logical operation on the value of the adjacent region identifier described in the adjacent region list as an identifier of a reference region, and the sample value of the shape signal of the target region to be decoded. That is, in the-overlapped portion 910 of the overlapped region 908, the shape of the target region can be restored by selecting not the sample value of the shape signal of the target region but the shape signal, the sample value of which is identical to the value of the adjacent region identifier.

While in the second embodiment, coded image signals of all regions in a frame image are decoded and regenerated, the overlapping control means 1010 may receive a control signal for specifying required regions externally, and overlap and output decoded image signals of desired required regions.

In this case, in the overlapping means 1014, regenerated shape signals Rs of all regions are stored in the first memory 1018a and regenerated texture signals Rt of desired required regions are stored in the second memory 1018b under the control of the overlapping control means 101, that is, the first and second switches 1204a and 1204b are respectively on-off controlled independently in accordance with signals output from the comparator 1200.

[Embodiment 3]

Figure 14:
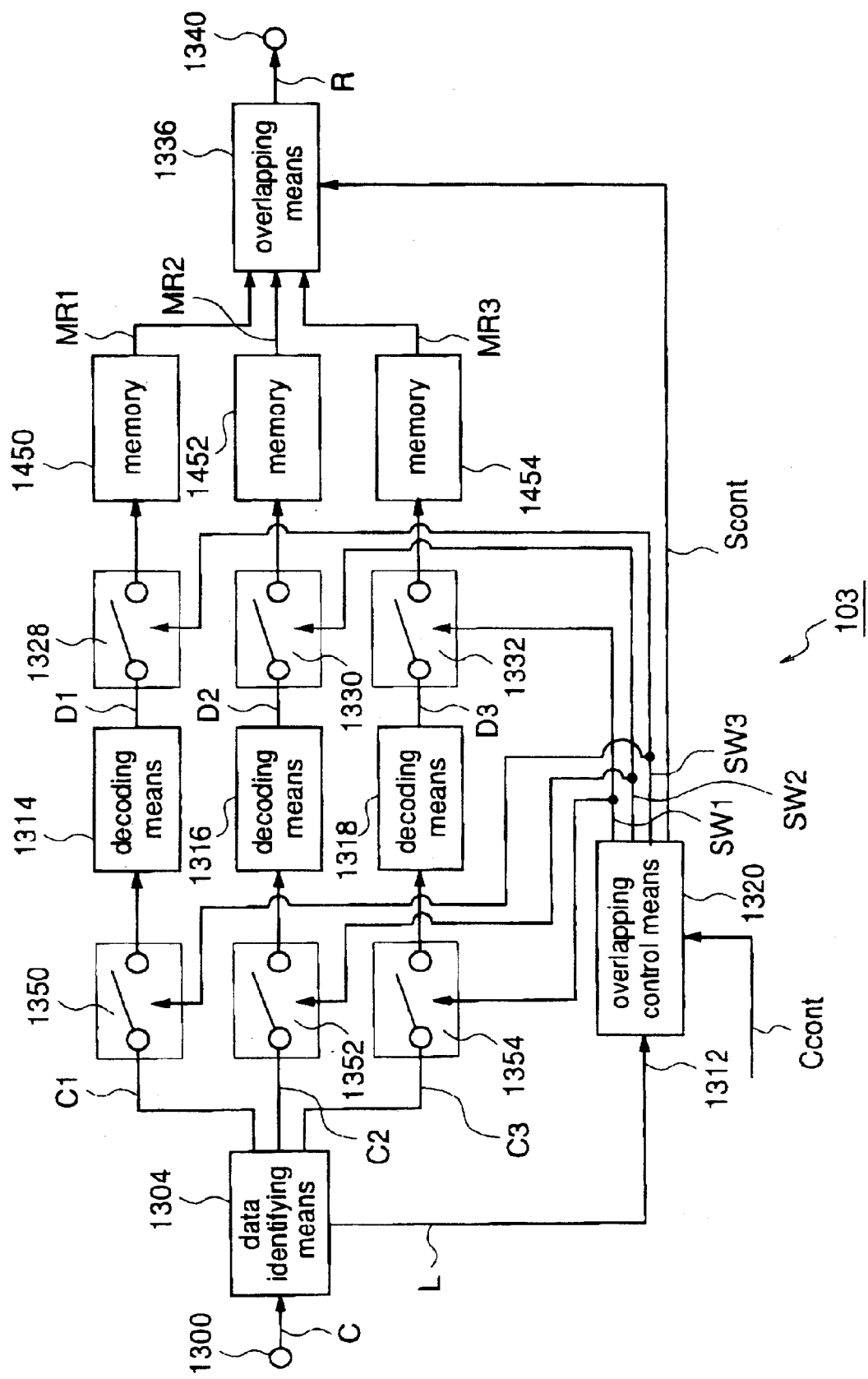
FIG. 14 is a block diagram showing a digital image decoding apparatus according to a third embodiment of the present invention.

FIG. 14 is a block diagram illustrating a digital image decoding apparatus according to a third embodiment of the present invention.

In FIG. 14, a digital image decoding apparatus 103 according to this third embodiment is constructed so as to decode any of coded image signals (bit streams) having data structures shown in FIGS. 6(a), 6(b), 6(c), 7 and 8.

In this third embodiment, to simplify the description, no distinction is made between a coded shape signal and a coded texture signal, and these signals are regarded as a coded image signal. Except for a part where a coded shape signal and a coded texture signal are described separately, these signals are subjected to the same processing. Further, since this digital decoding apparatus decodes an image signal from the digital coding apparatus 101 according to the first embodiment, the number of regions corresponding to the respective objects in one frame image is three.

The image decoding apparatus 103 includes an input terminal 1300 to which a coded image signal C from the image coding apparatus 101 is applied; a data identifying means 1304 which receives the coded image signal C, and separates the coded image signal C into coded image signals C1, C2, and C3 corresponding to the first, second, and third regions 202, 204, and 206, respectively, and adjacent region list information L; first, second, and third decoding means 1314, 1316, and 1318 which decode the coded image signals C1, C2, and C3 to generate regenerated image signals D1, D2, and D3, respectively; and first, second, and third memories 1450, 1452, and 1454 which store the regenerated image signals D1, D2, and D3, respectively.

Further, the image decoding apparatus 103 includes first, second, and third previous-stage switches 1350, 1352, and 1354 placed between the data identifying means 1304 and the decoding means 1314, 1316, and 1318, respectively; and first, second, and third subsequent-stage switches 1328, 1330, and 1332 placed between the decoding means 1314, 1316, and 1318, and the corresponding memories 1450, 1452, and 1454, respectively.

Furthermore, the image decoding apparatus 103 includes an overlapping means 1336 which performs image-overlapping of regenerated signals MR1~MR3 read from the memories 1450, 1452, and 1454 to generate an image signal R corresponding to one frame image, and outputs the image signal R toward the output terminal 1340; and an overlapping control means 1320 which receives at least the adjacent region list information L between the list information L and an external control signal Ccont, controls the switches 1350 and 1328 with a switch control signal SW1, the switches 1352 and 1330 with a switch control signal SW2, and the switches 1354 and 1332 with a switch control signal SW3, and controls the overlapping means 1336 with an overlapping control signal Scont.

A description is given of the operation of the image decoding apparatus.

Figure 8:
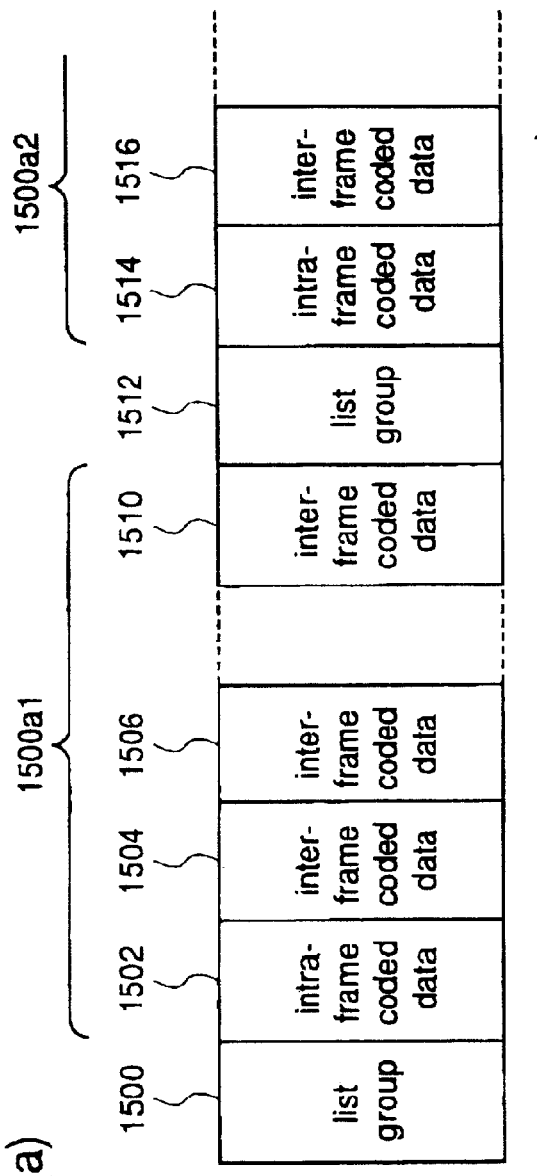
FIGS. 8(a) and 8(b) are diagrams showing another data structure of a coded image signal generated by the digital image coding apparatus of the first embodiment.
Figure 8:
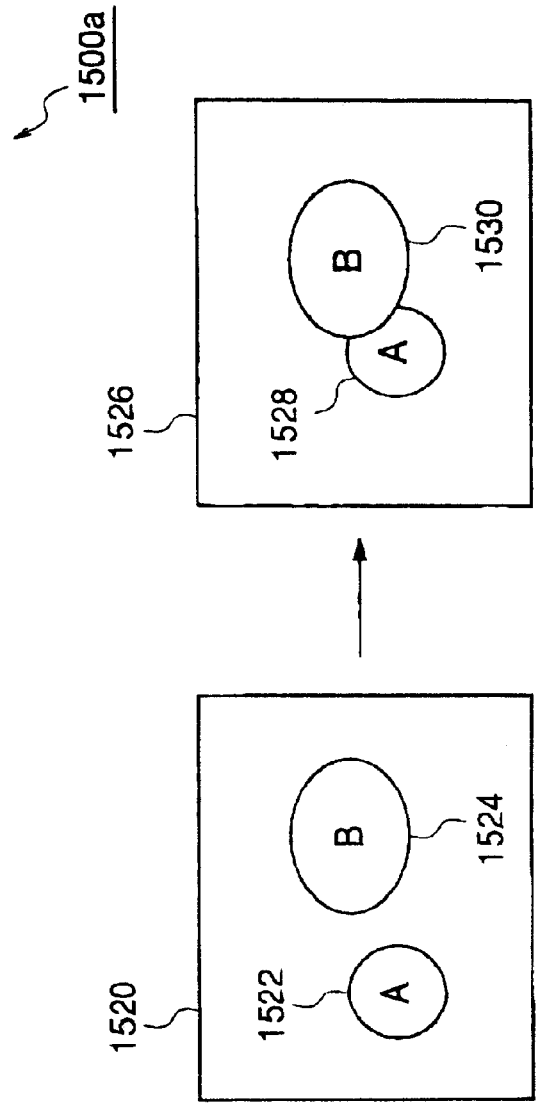

When the coded image signal C having the data structure shown in any of FIGS. 6, 7, and 8 is input to the input terminal 1300, the data identifying means 1304 separates the coded image signal C into the coded image signals C1~C3 corresponding to the first to third regions set in one frame image at the coding end, and the adjacent region list information L containing identifiers of adjacent regions required for restoring the shapes of transformed regions to the arbitrary shapes before transformation.

In the overlapping control means 1320, the switch control signals SW1~SW3 are generated according to the adjacent region list information L, and the previous-stage switches are subjected to ON/OFF control by these control signals. Thereby, only the coded signals of the target regions and the coded signals of the adjacent regions required for decoding the target regions are supplied to the decoding means corresponding to the respective regions.

The decoding means 1314, 1316, and 1318 decode the coded image signals of the respective regions, and output the regenerated signals D1~D3 corresponding to the respective regions. Further, the subsequent-stage switches are also subjected to ON/OFF control by the control signals SW1~SW3, and the regenerated signals D1~D3 corresponding to the respective regions are stored in the memories 1450, 1452, and 1454 corresponding to the respective regions.

In parallel with the decoding process, the overlapping control means 1320 generates the overlapping control signal Scont according to the adjacent region list information L, and this control signal Scont and the regenerated signals MR1~MR3 read from the respective memories ate supplied to the overlapping means 1336.

In the overlapping means 1336, the respective regions are overlapped so that the shapes of the transformed regions are restored to the arbitrary shapes before transformation, thereby generating an image signal R corresponding to one frame image.

Figure 15:
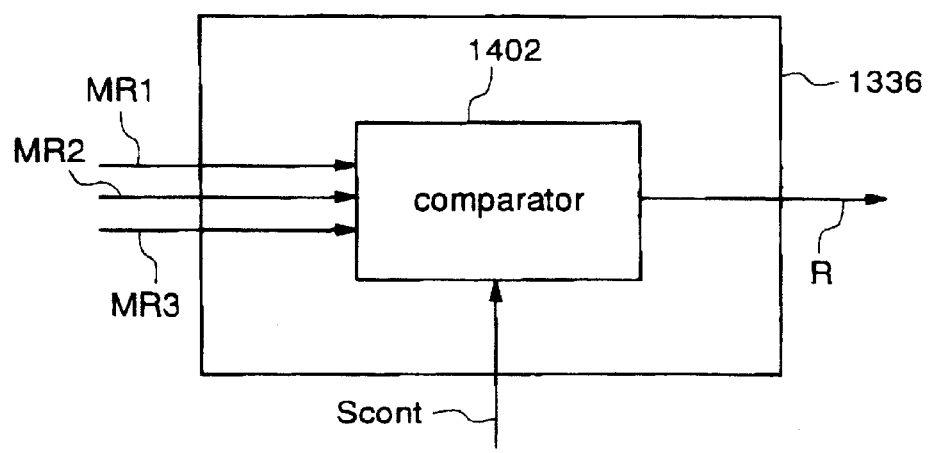
FIG. 15 is a diagram for explaining a construction and operation of overlapping means in the digital image decoding apparatus of the third embodiment.
Figure 16:
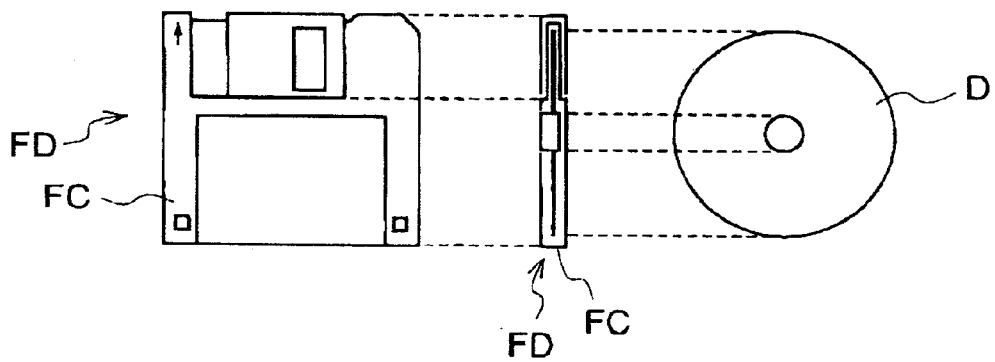
FIGS. 16(a)–16(c) are diagrams showing a data recording medium in which a program for implementing the coding or decoding method of each embodiment in a computer system is stored.
Figure 16:
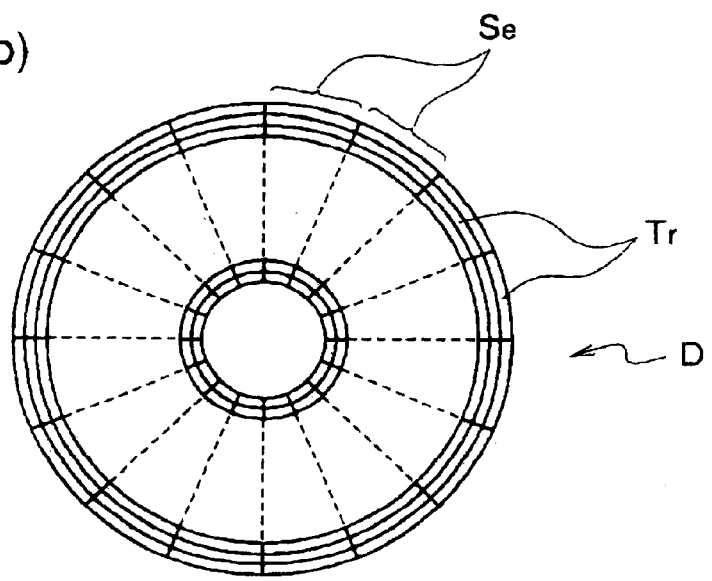
Figure 16:
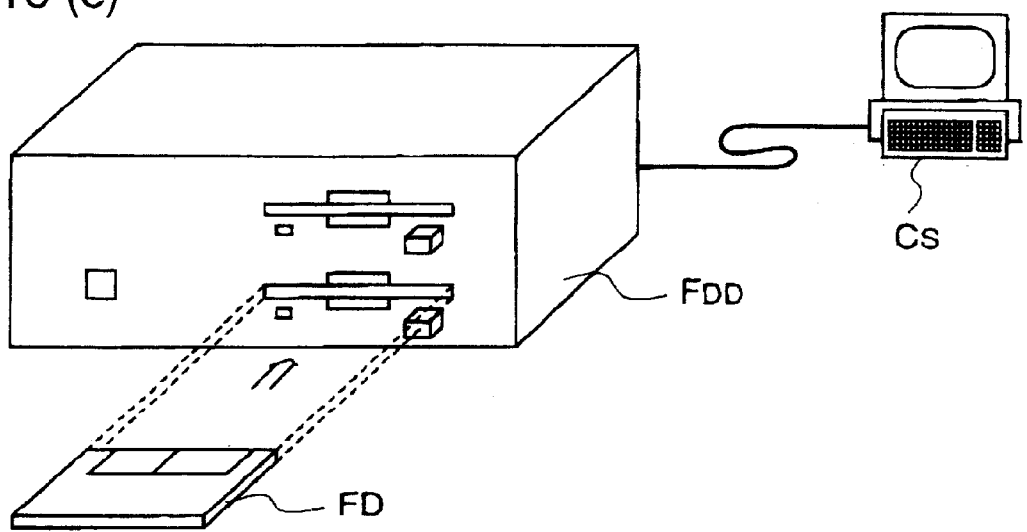

Hereinafter, the overlapping process will be complemented using FIG. 15.

The regenerated signals MR1, MR2, and MR3 read from the memories 1450, 1452, and 1454, respectively, are input to a comparator 1402 constituting the overlapping means 1336, and the overlapping control signal Scont from the overlapping control means 1320 is input to the comparator 1402 as well. Receiving these signals, the comparator 1402 compares the signal value of the overlapping control signal Scont with the sample value of the regenerated shape signal included in each of these regenerated signals, like the comparator 1200 according to the second embodiment shown in FIG. 11. Then, the comparator 1200 performs overlapping of the respective regions according to the result of the comparison to regenerate an image signal R corresponding to one frame image. To be specific, in a portion where the regions overlap, the comparator selects the sample value of the texture signal of the upper region and then generates the image signal R corresponding to one frame image.

Preferably, the regenerated signal R corresponding to one frame image is output from the output terminal 1340 after all of the regions constituting the frame image have been overlapped.

In this third embodiment, regeneration of an image signal corresponding to a desired region or one frame image by overlapping the respective regions described above can be implemented by performing logical operation on the values of the adjacent region identifiers described in the adjacent region list as identifiers of reference regions, and the sample values of the regenerated shape signals of the target regions to be decoded.

Furthermore, when a control signal Scont designating a required region is input to the overlapping control means or the like, each switch is controlled so that only a coded image signal of the required region and a coded image signal of an adjacent region required for restoring the shape-of the transformed required region are supplied to each decoding means, and a decoded image. signal from each decoding means is stored in each memory. As a result, an image of a desired region can be regenerated with high efficiency by decoding only a coded signal of a required region and a coded image signal of an adjacent region required for restoring the shape of the required region to that before transformation, followed by overlapping these regions.

In the decoding apparatus according to the third embodiment shown in FIG. 14, a shape signal and a texture signal are described as an image signal without making a distinction between them. However, as already described with respect to the second embodiment, a coded shape signal and a coded texture signal included in a coded image signal of each region are subjected to decoding by the respective decoding means, and a decoded shape signal and a decoded texture signal included in a decoded image signal are subjected to overlapping in the overlapping means 1336.

In the aforementioned embodiments, one frame image is divided into plural regions, and image signals corresponding to the respective regions are subjected to coding and decoding. However, the overlapping method according to any of the aforementioned embodiments may be applied to the case where a plurality of frame images are composited and the composite image is displayed on one screen. In this case, a list containing the hierarchical relationship of the frame images, i.e., which frame image is to be displayed in front in relation to the other frame image, is generated, and the respective frame images are coded and transmitted (or recorded) together with the list and, when regenerating these frame images, these frame images are composited with reference to the list.

While in the second and third embodiments, the digital image decoding apparatus which receives coded shape signals and coded texture signals of all regions or desired required regions in a frame image and decodes these coded signals, has been described, it may receive only the coded shape signals of all regions or desired required regions, and output only regenerated shape signals in which the coded shape signals have been decoded.

In addition, while in the second and third embodiments the digital image decoding apparatus which receives coded shape signals and coded texture signals of all regions or desired required regions, decodes these coded signals, and outputs regenerated shape signals and regenerated texture signals, has been described, it may output only the regenerated shape signals.

When an image processing program for implementing, by software, any of the coding and decoding processes by the digital image coding and decoding apparatuses according to the aforementioned embodiments is recorded in a data storage medium, such as a floppy disk, the image processing according to any of the aforementioned embodiments can be easily executed in an independent computer system.

FIGS. 16(a)–16(c) are diagrams for explaining how to execute the coding process by the image coding apparatus according to the first embodiment or the decoding process by the image decoding apparatus according to the second or third embodiment in a computer system, using a floppy disk which contains the above-mentioned image processing program.

FIG. 16(a) shows a front view of a floppy disk FD, a cross-sectional view thereof, and a floppy disk body D. FIG. 16(b) shows an example of a physical format of the floppy disk body D.

The floppy disk body D is contained in a case FC, providing the floppy disk FD. On the surface of the disk body D, a plurality of tracks Tr are formed concentrically from the outer circumference of the disk toward the inner circumference. Each track is divided into 16 sectors in the angular direction. Therefore, in the floppy disk FD containing the above-mentioned program, data of the program are recorded in assigned FIG. 16(c) shows the structure for recording the program in the floppy disk FD and performing image processing using the program recorded in the floppy disk FD. To be specific, when the image processing program is recorded in the floppy disk FD, data of the program are written in the floppy disk FD from the computer system Cs through the floppy disk drive FDD. When the above-mentioned coding apparatus or decoding apparatus is constructed in the computer system Cs from the program recorded in the floppy disk FD, the program is read from the floppy disk FD by the floppy disk drive FDD and then loaded to the computer system Cs.

Although in the above description a floppy disk is employed as a data storage medium, an optical disk may be employed. Also in this case, image coding or decoding can be carried out by software in similar manner to the above-mentioned case of using a floppy disk. The data storage medium is not restricted to these disks, and any medium may be employed as long as it can contain the program, for example, an IC card or a ROM cassette.

What is claimed is:

1. A digital image coding method comprising the steps of:
   dividing an image into plural regions each having an arbitrary shape, subjecting an image signal of a required region of the plural regions to transformation so that an arbitrary shape of the required region of a boundary between the required region and a region adjacent thereto is transformed, and compressively coding the resulting image signal of the required region and compressively coding image signals of regions except the required region without subjecting them to transformation;
   generating identifiers for identifying respective regions;
   generating list information which describes an identifier of at least one region adjacent to the required region, which is required for restoring a transformed shape of the required region to its arbitrary shape before transformation; and
   outputting compressively coded data in which image signals of respective regions have been compressively coded, the identifiers of respective regions, and the list information as a coded image signal.

2. A digital image decoding method for decoding and regenerating a coded image signal which has been compressively coded by a digital image coding method of claim 1, said method comprising:
   a decoding step for decoding compressively coded data included in the coded image signal to regenerate image signals of respective regions, wherein a regenerated image signal of the required region is restored by a prescribed process according to list information and shape information of at least one required adjacent region which are included in the coded image signal so that a shape of the required region is restored to its arbitrary shape before transformation.

3. The digital image decoding method of claim 2 wherein the prescribed process is carried out by performing logical operation on compressively coded data of the required region and compressively coded data of a region adjacent thereto by referring to the list information, and restoring the shape of the required region to its arbitrary shape before transformation.

4. A digital image decoding method for decoding and regenerating a coded image signal which has been compressively coded by a digital image coding method of claim 1, said method comprising:
   a decoding step for decoding compressively coded data included in the coded image signal to regenerate image signals of respective regions, wherein after compressively coded data of a required region included in the coded image signal is identified, and the compressively coded data of the identified required region is decoded, a shape of the decoded required region is restored to its arbitrary shape before transformation by a prescribed process by referring to the list information and shape information of at least one required adjacent region and then regenerated when an arbitrary shape of the identified required region has been transformed, while compressively coded data of the required region is decoded and then immediately regenerated when an arbitrary shape of the required region has not been transformed.

5. The digital image decoding method of claim 4 wherein the prescribed process is carried out by performing logical operation on compressively coded data of the required region and compressively coded data of a region adjacent thereto by referring to the list information, and restoring the shape of the prescribed shape to its arbitrary shape before transformation.

6. A digital image decoding apparatus for decoding and regenerating a coded image signal which has been compressively coded by a digital image coding method of claim 1, said apparatus comprising:
  data identifying means for identifying compressively coded data, identifiers, and list information of respective regions in the coded image signal;
  decoding means for decoding the compressively coded data to regenerate image signals of respective regions;
  a frame memory for storing regenerated image information of respective regions; and
  overlapping means for receiving a regenerated image signal and list information of the required region, and the regenerated image signal stored in the frame memory, and restoring a shape of the required region to its arbitrary shape before transformation according to the list information,
  a regenerated image signal of the required region having a restored shape being stored in the frame memory.

7. The digital image decoding apparatus of claim 6 wherein the overlapping means restores the shape of the required region to its arbitrary shape before transformation by performing logical operation on compressively coded data of the required region and compressively coded data of at least one region adjacent thereto according to the list information.

8. The digital image decoding apparatus of claim 7 further comprising required region selecting means for selecting a required region from the plural regions, and
  a coded image signal of the selected required region and a coded image signal of at least one adjacent region required for restoring a shape of the required region to its arbitrary shape before transformation are decoded.

9. The digital image decoding apparatus of claim 6 further comprising required region selecting means for selecting a required region from the plural regions, and
  a coded image signal of the selected required region and a coded image signal of at least one adjacent region required for restoring a shape of the required region to its arbitrary shape before transformation are decoded.

10. A digital image decoding apparatus for decoding a coded image signal which has been compressively coded by a digital image coding method of claim 1, said apparatus comprising:
  data identifying means for separating compressively coded data, identifiers, and list information of respective regions from the coded image signal, and identifying compressively coded data of at least one adjacent region required for restoring a transformed shape of the required region to its arbitrary shape before transformation according to the list information;
  decoding means for decoding the compressively coded data to regenerate image signals of respective regions;
  a frame memory for storing regenerated image information of respective regions; and
  overlapping means for receiving regenerated image signals stored in the frame memory of the required region and its adjacent region and list information, and restoring a shape of the required region to its arbitrary shape before transformation according to the list information,
  a regenerated image signal of the required region having a restored shape being stored in the frame memory.

11. The digital image decoding apparatus of claim 10 wherein the overlapping means restores the shape of the required region to its arbitrary shape before transformation by performing logical operation on compressively coded data of the required region and compressively coded data of at least one region adjacent thereto according to the list information.

12. The digital image decoding apparatus of claim 11 further comprising required region selecting means for selecting a required region from the plural regions, and
  a coded image signal of the selected required region and a coded image signal of at least one adjacent region required for restoring a shape of the required region to its arbitrary shape before transformation are decoded.

13. The digital image decoding apparatus of claim 10 further comprising required region selecting means for selecting a required region from the plural regions, and
  a coded image signal of the selected required region and a coded image signal of at least one adjacent region required for restoring a shape of the required region to its arbitrary shape before transformation are decoded.

14. A digital image decoding apparatus for decoding and regenerating a coded image signal which has been compressively coded by a digital image coding method of claim 1, said apparatus comprising:
  data identifying means for separating compressively coded data, identifiers, and list information of respective regions in the coded image signal;
  plural decoding means provided for the plural regions, for decoding compressively coded data of respective regions on the basis of the identifies of respective regions to generate regenerated image signals; and
  overlapping means for receiving the regenerated image signals of the respective regions which have been decoded by the plural respective decoding means and the list information, and restoring a shape of the required region to its arbitrary shape before transformation.

15. The digital image decoding apparatus of claim 14 wherein the overlapping means restores the shape of the required region to its arbitrary shape before transformation by performing logical operation on compressively coded data of the required region and compressively coded data of at least one region adjacent thereto according to the list information.

16. The digital image decoding apparatus of claim 15 further comprising required region selecting means for selecting a required region from the plural regions, and
  a coded image signal of the selected required region and a coded image signal of at least one adjacent region required for restoring a shape of the required region to its arbitrary shape before transformation are decoded.

17. The digital image decoding apparatus of claim 14 further comprising required region selecting means for selecting a required region from the plural regions, and
  a coded image signal of the selected required region and a coded image signal of at least one adjacent region required for restoring a shape of the required region to its arbitrary shape before transformation are decoded.

18. A data recording medium for storing a digital image decoding program executed by a computer which decodes and regenerates a coded image signal which has been compressively coded by a digital image coding method of claim 1, said program comprising the steps of:

separating compressively coded data, identifiers, and list information of respective regions from the coded image signal;

decoding the compressively coded data to regenerate image signals of respective regions;

storing regenerated image information of respective regions in a memory; and restoring a shape of the required region to its arbitrary shape before transformation on the basis of the regenerated image signal and the list information of the required region, regenerated image signals stored in the frame memory, and the list information, in the storing step of the image information, a regenerated image signal of the required region having a restored shape being stored in the frame memory.

19. The data recording medium of claim 18 wherein a shape of the required region is restored to its arbitrary shape before transformation by performing logical operation on compressively coded data of the required region and compressively coded data of at least one region adjacent thereto according to the list information.

20. The data recording medium of 19 wherein the digital image decoding program includes selecting a required region from the plural regions, and in the coding step, a coded image signal of the selected required region and a coded image signal of at least one adjacent region required for restoring a shape of the required region to its arbitrary shape before transformation are decoded.

21. The data recording medium of 18 wherein the digital image decoding program includes selecting a required region from the plural regions, and in the coding step, a coded image signal of the selected required region and a coded image signal of at least one adjacent region required for restoring a shape of the required region to its arbitrary shape before transformation are decoded.

22. A data recording medium for storing a digital image decoding program executed by a computer which decodes and regenerate a coded image signal which has been compressively coded by a digital image coding method of claim 1, said program comprising the steps of:

separating compressively coded data, identifiers, and list information of respective regions from the coded image signal and identifying compressively coded data of at least one adjacent region required for restoring a transformed shape of the required region to its arbitrary shape before transformation according to the list information;

decoding the compressively coded data to regenerate image signals of respective regions;

storing regenerated image information of respective regions; and receiving regenerated image signals stored in the memory of the required region and at least one region adjacent thereto and list information, and restoring a transformed shape of the required region to its arbitrary shape before transformation according to the list information, in the storing step of the image information, a regenerated image signal of the required region having a restored shape being stored in the frame memory.

23. The data recording medium of claim 22 wherein, a shape of the required region is restored to its arbitrary shape before transformation by performing logical operation on compressively coded data of the required region and compressively coded data of at least one region adjacent thereto according to the list information.

24. The data recording medium of 23 wherein the digital image decoding program includes selecting a required region from the plural regions, and in the coding step, a coded image signal of the selected required region and a coded image signal of at least one adjacent region required for restoring a shape of the required region to its arbitrary shape before transformation are decoded.

25. The data recording medium of 22 wherein the digital image decoding program includes selecting a required region from the plural regions, and in the coding step, a coded image signal of the selected required region and a coded image signal of at least one adjacent region required for restoring a shape of the required region to its arbitrary shape before transformation are decoded.

26. A data recording medium for storing a digital image decoding program executed by a computer which decodes and regenerates a coded image signal which has been compressively coded by a digital image coding method of claim 1, said program comprising the steps of:

separating compressively coded data, identifiers, and list information of respective regions from the coded image signal;

decoding compressively coded data of respective regions using the corresponding plural decoding means on the basis of identifiers of respective regions; and receiving the regenerated image signals of the respective regions decoded by the respective decoding means and the list information, and restoring a transformed shape of the required region to its arbitrary shape before transformation.

27. The data recording medium of claim 26 wherein a shape of the required region is restored to its arbitrary shape before transformation by performing logical operation on compressively coded data of the required region and compressively coded data of at least one region adjacent thereto according to the list information.

28. The data recording medium of 27 wherein the digital image decoding program includes selecting a required region from the plural regions, and in the coding step, a coded image signal of the selected required region and a coded image signal of at least one adjacent region required for restoring a shape of the required region to its arbitrary shape before transformation are decoded.

29. The data recording medium of 26 wherein the digital image decoding program includes selecting a required region from the plural regions, and in the coding step, a coded image signal of the selected required region and a coded image signal of at least one adjacent region required for restoring a shape of the required region to its arbitrary shape before transformation are decoded.

30. A digital image coding method comprising the steps of:

dividing an image into plural regions each having all arbitrary shape, assigning priorities to the plural regions by a prescribed process, subjecting an image signal of a required region selected in accordance with the priorities to transformation so that an arbitrary shape of the required region of a boundary between the required region and a region adjacent thereto is transformed, and compressively coding the resulting image signal of the required region and compressively coding image signals of regions except the required region without subjecting them to transformation;

generating identifiers for identifying respective regions;

generating list information which describes an identifier of at least one region adjacent to the required region, which is required for restoring a transformed shape of the required region to its arbitrary shape before transformation; and outputting compressively coded data in which image signals of respective regions have been compressively coded, the identifiers of respective regions, and the list information as a coded image signal.

31. A digital image coding apparatus comprising:

region dividing means for dividing an image into plural region each having an arbitrary shape, and generating division map information indicating a boundary of an adjacent region;

list generating means for generating identifiers which identify the plural regions, respectively, and list information which describes an identifier of at least one adjacent region required for restoring a transformed shape of a required region to its arbitrary shape before transformation correspondingly to an identifier of the required region for the required region of the plural regions; and coding means for subjecting an image signal of the required region to transformation according to the list information so that a shape of the required region of a boundary between the required region and a region adjacent thereto is transformed, and compressively coding the resulting image signal of the required region and compressively coding image signals of regions except the required region without subjecting them to transformation, compressively coded data in which image signals of respective regions have been compressively coded, the identifiers of respective regions, and the list information being output as a coded image signal.

32. A digital image coding apparatus comprising:

region dividing means for dividing an image into plural region each having an arbitrary shape, and generating division map information indicating a boundary of an adjacent region;

overlapping relationship setting means for setting the relationship for overlapping respective images;

list generating means for generating identifiers which identify the plural regions, respectively, and list information which describes an identifier of at least one adjacent region required for restoring a transformed shape of a required region to its arbitrary shape before transformation correspondingly to an identifier of the required region, according to the overlapping relationship; and coding means for subjecting an image signal of the required region to transformation according to the list information so that an arbitrary shape of the required region of a boundary between the required region and a region adjacent thereto is transformed, and compressively coding the image signal of the required region and compressively coding image signals of regions except the required region without subjecting them to transformation, compressively coded data in which image signals of respective regions have been compressively coded, identifiers of respective region, and the list information being output as a coded image signal.

33. A data recording medium for storing a digital image coding program executed by a computer which performs coding a digital image signal, said program comprising the steps of:

dividing an image into plural regions each having an arbitrary shape, subjecting an image signal of a required region of the plural regions to transformation so that a shape of the required region of a boundary between the required region and a region adjacent thereto is transformed, and compressively coding the image signal of the required region and compressively coding image signals of regions except the required region without subjecting them to transformation;

generating identifiers for identifying respective regions;

generating list information which describes an identifier of at least one region adjacent to the required region, which is required for restoring the transformed shape to its arbitrary shape before transformation; and outputting compressively coded data in which image signals of respective regions have been compressively coded, the identifiers of respective regions, and the list information as a coded image signal.

34. A data recording medium for storing a digital image coding program executed by a computer which performs coding a digital image signal, said program comprising the steps of:

dividing an image into plural regions each having an arbitrary shape, assigning priorities to the plural region by a prescribed process, subjecting an image signal of a required region selected in accordance with the priorities so that a shape of the required region of a boundary between the required region and a region adjacent thereto is transformed, compressively coding the resulting image signal of the required region and compressively coding image signals of regions except the required region without subjecting them to transformation;

generating identifiers for identifying respective regions;

generating list information which describes an identifier of at least one region adjacent to the required region, which is required for restoring the transformed shape to its arbitrary shape before transformation; and outputting compressively coded data in which image signals of respective regions have been compressively coded, the identifiers of respective regions, and the list information as a coded image signal.

35. A machine data structure for image transmission for transmitting a coded image signal in which a digital image signal has been coded, said data structure comprising:

coded data obtained by subjecting an image signal of a required region of plural regions each having an arbitrary shape to transformation so that an arbitrary shape of the required region of a boundary between the required region and a region adjacent thereto, is transformed and then by compressively coding the resulting image signal of the required region and compressively coding image signals of regions except the required region without subjecting them to transformation;

identifiers for identifying respective regions; and list information which describes an identifier of at least one adjacent region required for restoring the transformed shape of the required region to its arbitrary shape before transformation.

* * * * *

UNITED STATES PATENT AND TRADEMARK OFFICE
CERTIFICATE OF CORRECTION

PATENT NO. : 6,516,094 B1
DATED : February 4, 2003
INVENTOR(S) : Jun Takahashi et al.

It is certified that error appears in the above-identified patent and that said Letters Patent is hereby corrected as shown below:

<u>Title page,</u>
Item [57], ABSTRACT,
Line 6, delete "-" after "is".
Line 9, change "with-out" to -- without --.
Line 17, change "and the list information an a coded image signal" to -- and the list information as a coded image signal --

<u>Column 28,</u>
Line 61, change "having all arbitrary" to -- having an arbitrary --.

<u>Column 30,</u>
Line 49, change "A machine data structure for image..." to -- A machine readable data structure for image... --

Signed and Sealed this

Twelfth Day of August, 2003

JAMES E. ROGAN
*Director of the United States Patent and Trademark Office*